US012672134B2

(12) United States Patent
Huang et al.

(10) Patent No.: US 12,672,134 B2
(45) Date of Patent: Jun. 30, 2026

(54) DATA TRANSMISSION METHOD AND APPARATUS

(71) Applicant: HUAWEI TECHNOLOGIES CO., LTD., Shenzhen (CN)

(72) Inventors: Su Huang, Shanghai (CN); Jinhuan Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 18/522,412

(22) Filed: Nov. 29, 2023

(65) Prior Publication Data

US 2024/0107529 A1     Mar. 28, 2024

Related U.S. Application Data

(63) Continuation of application No. PCT/CN2022/095813, filed on May 28, 2022.

(30) Foreign Application Priority Data

May 31, 2021     (CN) .......................... 202110605597.2

(51) Int. Cl.
*H04W 72/12*          (2023.01)
*H04L 5/00*           (2006.01)
(Continued)

(52) U.S. Cl.
CPC ....... *H04W 72/1268* (2013.01); *H04L 5/0051* (2013.01); *H04W 52/08* (2013.01); (Continued)

(58) Field of Classification Search
CPC . H04W 72/1268; H04W 52/08; H04W 52/10; H04W 52/367; H04W 72/0457; (Continued)

(56) References Cited

U.S. PATENT DOCUMENTS

2014/0269454 A1*  9/2014  Papasakellariou .... H04W 72/23
                                                  370/280
2021/0126816 A1*  4/2021  Davydov .............. H04L 5/0091
(Continued)

FOREIGN PATENT DOCUMENTS

WO          2020047080 A1     3/2020

OTHER PUBLICATIONS

3rd Generation Partnership Project; Technical Specification Group Radio Access Network; NG Radio Access Network (NG-RAN); Stage 2 functional specification of User Equipment (UE) positioning in NG-RAN (Release 16). 3GPP TS 38.305 V16.4.0 (Mar. 2021). total 119 pages.
(Continued)

*Primary Examiner* — Steven Hieu D Nguyen

(57) ABSTRACT

A data transmission method and an apparatus are disclosed. The method includes that a base station sends configuration information to UE. The UE receives the configuration information, where the configuration information includes an association relationship between a first SRS configuration and one or more PUSCH configurations, and a first BWP in which the first SRS configuration is located is different from a BWP in which each PUSCH configuration is located. The UE sends a first SRS on the first BWP based on the first SRS configuration, and sends a first PUSCH based on a first PUSCH configuration, where the first PUSCH configuration
(Continued)

UL BWP: uplink bandwidth part
SRS: sounding reference signal
DL BWP: downlink bandwidth part is one of the one or more PUSCH configurations. Correspondingly, the base station receives the first SRS based on the first SRS configuration, and receives the first PUSCH based on the first PUSCH configuration.

20 Claims, 7 Drawing Sheets

(51) Int. Cl.

| | |
|---|---|
| *H04W 52/08* | (2009.01) |
| *H04W 52/10* | (2009.01) |
| *H04W 52/36* | (2009.01) |
| *H04W 72/0457* | (2023.01) |
| *H04W 72/1268* | (2023.01) |
| *H04W 72/232* | (2023.01) |

(52) U.S. Cl.
CPC ......... *H04W 52/10* (2013.01); *H04W 52/367* (2013.01); *H04W 72/0457* (2023.01); *H04W 72/232* (2023.01)

(58) Field of Classification Search
CPC ... H04W 72/232; H04W 52/54; H04W 72/23; H04W 72/0453; H04L 5/0051; H04L 5/0044; H04L 5/001; H04L 5/0053; H04L 5/0048
See application file for complete search history.

(56) References Cited

U.S. PATENT DOCUMENTS

| | | | |
|---|---|---|---|
| 2022/0015118 A1* | 1/2022 | Park | H04B 7/0408 |
| 2022/0094500 A1* | 3/2022 | Liu | H04B 7/0408 |
| 2022/0232589 A1* | 7/2022 | Yang | H04L 5/0044 |
| 2023/0114039 A1* | 4/2023 | Manolakos | H04W 52/281 |
| | | | 370/329 |
| 2023/0118905 A1* | 4/2023 | Go | H04B 7/0456 |
| | | | 370/329 |

OTHER PUBLICATIONS

3rd Generation Partnership Project; Technical Specification Group Radio Access Network; NR; Requirements for support of radio resource management (Release 17). 3GPP TS 38.133 V17.1.0 (Mar. 2021). total 46 pages.

Huawei et al:"Overview of wider bandwidth operations." 3GPP TSG RAN WG1 NR Ad Hoc Meeting R1-1709972 Qingdao, China, Jun. 27-30, 2017. total 9 pages.

Nokia, Nokia Shanghai Bell:"Remaining details on NR power control framework",3GPP TSG RAN WG1 Meeting 91, Reno, Nevada, USA, Nov. 27-Dec. 1, 2017, R1-1721038, total 7 pages.

Extended European Search Report issued in EP22815196.5, dated Sep. 17, 2024, 12 pages.

* cited by examiner

Terminal device (UE) 1

Base station

UE 5

UE 6

UE 2

UE 4

UE 3

TP ng-eNB

TP

LMF

E-SMLC

LTE-Uu

NG-C

NL1

SLP

Xn

UE

SET

NR-Uu gNB

NG-C

AMF

NG-RAN

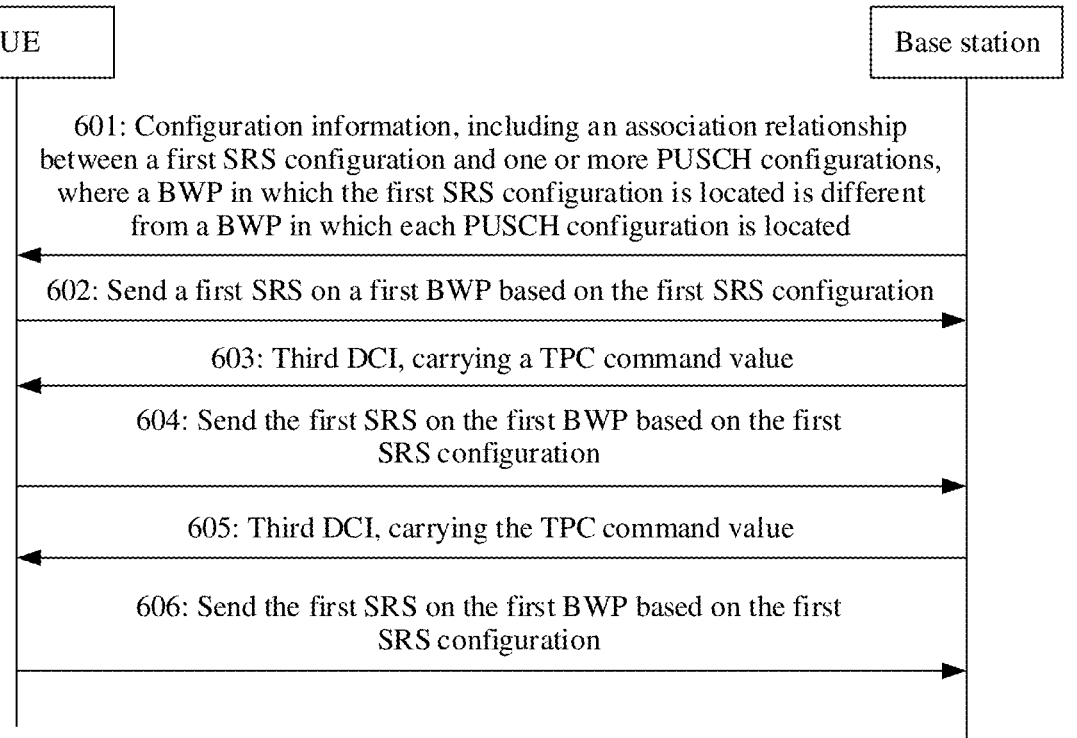

601: Configuration information, including an association relationship between a first SRS configuration and one or more PUSCH configurations, where a BWP in which the first SRS configuration is located is different from a BWP in which each PUSCH configuration is located 602: Send a first SRS on a first BWP based on the first SRS configuration 603: Third DCI, carrying a TPC command value 604: Send the first SRS on the first BWP based on the first SRS configuration 605: Third DCI, carrying the TPC command value 606: Send the first SRS on the first BWP based on the first SRS configuration

FIG. 6

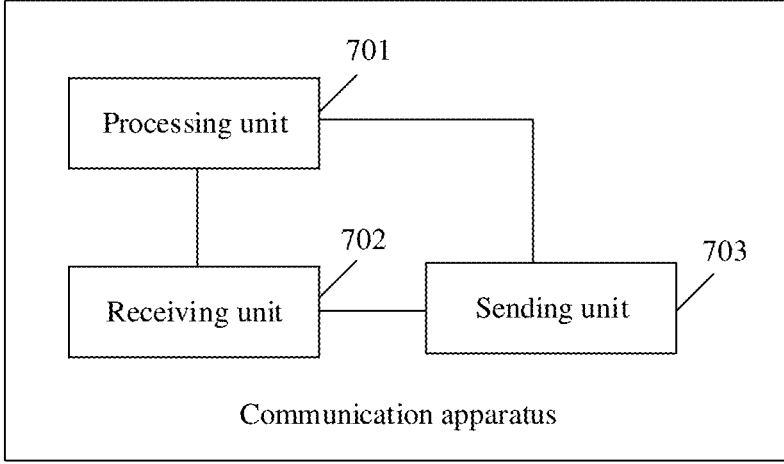

FIG. 7

DATA TRANSMISSION METHOD AND APPARATUS

CROSS-REFERENCE TO RELATED APPLICATIONS

This application is a continuation of International Application No. PCT/CN2022/095813, filed on May 28, 2022, which claims priority to Chinese Patent Application No. 202110605597.2, filed on May 31, 2021. The disclosures of the aforementioned applications are hereby incorporated by reference in their entireties.

TECHNICAL FIELD

The present disclosure relates to the field of communication technologies, and in particular, to a data transmission method and an apparatus.

BACKGROUND

Usually, a sounding reference signal (SRS) configuration that is set by a base station needs to be included in a currently active bandwidth part (BWP) of a terminal device, so that the terminal device performs data transmission and SRS sending in an uplink (UL) BWP.

In addition, when the terminal device performs BWP switching, a to-be-sent SRS also changes. For example, the base station may send downlink control information to the terminal device on an original BWP, to schedule uplink and downlink data on a target BWP. Further, the terminal device switches to the target BWP, completes uplink data sending and/or downlink data receiving, and camps on the target BWP, until next downlink control information for BWP switching is received. When the terminal device camps on the target BWP, an SRS on the original BWP is no longer sent, but an SRS on the target BWP is sent.

However, before the terminal device performs BWP switching, the base station cannot obtain channel information on the target BWP.

SUMMARY

The present disclosure provides a data transmission method and an apparatus, so that a base station can obtain in advance channel information on a BWP to be switched by UE.

According to a first aspect, an embodiment of the present disclosure provides a data transmission method. The method includes:

receiving configuration information, where the configuration information includes an association relationship between a first sounding reference signal (SRS) configuration and one or more physical uplink shared channel (PUSCH) configurations, and a first bandwidth part (BWP) in which the first SRS configuration is located is different from a BWP in which each PUSCH configuration is located; sending a first SRS on the first BWP based on the first SRS configuration; and sending a first PUSCH based on a first PUSCH configuration, where the first PUSCH configuration is one of the one or more PUSCH configurations.

The method provided in this embodiment may be applied to a communication apparatus, and the communication apparatus may be a terminal device.

Usually, when UE performs BWP switching, if the UE still sends an SRS on an original BWP, a base station cannot obtain channel information on a target BWP.

Therefore, in this embodiment, when sending the first SRS, the UE may jump out of a currently active BWP of the UE, and send the first SRS on the first BWP (the first BWP is not the currently active BWP of the UE). In addition, sending of the first SRS may not be affected by BWP switching. In other words, the first SRS is sent regardless of a BWP in which the UE is located. To be specific, in this embodiment, the first SRS independent of data scheduling may be used, so that the first SRS is independent of sending of an SRS for data BWP switching. In this way, the base station may obtain channel information (which may also be referred to as a channel status) on a to-be-switched BWP before the UE performs BWP switching.

In a possible implementation, the first SRS is used for positioning.

In this embodiment, the first SRS may be used for multiple input multiple output (MIMO), or the first SRS is used for positioning. In other words, the first SRS shown in this embodiment may be an SRS (for example, an SRS described in FIG. 2a below) in MIMO, or may be an SRS (for example, an SRS described in FIG. 2b below) in positioning.

In a possible implementation, the sending a first PUSCH includes: sending the first PUSCH through an antenna port that is the same as that of the first SRS; and/or sending the first PUSCH by using an open-loop power control parameter that is the same as that of the first SRS.

In a possible implementation, the first PUSCH configuration is further associated with a second SRS configuration, and the method further includes: receiving first DCI, where the first DCI carries first indication information, and the first indication information indicates that the first PUSCH is associated with the first SRS configuration or is associated with the second SRS configuration.

In this embodiment, a BWP in which the second SRS configuration is located is the same as a BWP in which the first PUSCH configuration is located. For example, that the first indication information indicates that the first PUSCH is associated with the first SRS configuration includes: The first PUSCH is associated with all resource sets in the first SRS configuration; or the first indication information indicates that the first PUSCH is associated with one or more SRS resource sets in the first SRS configuration; or the first indication information indicates that the first PUSCH is associated with one or more SRS resources in one SRS resource set in the first SRS configuration. For example, when the first indication information indicates that the first PUSCH is associated with a first SRS resource set in the first SRS configuration, the first DCI may further include an SRI. The SRI indicates an SRS resource that is in the first SRS resource set and that is associated with the first PUSCH. It may be understood that, for description that the first indication information indicates that the first PUSCH is associated with the second SRS configuration, refer to the description that the first PUSCH is associated with the first SRS configuration.

In a possible implementation, the first SRS configuration includes configuration information of a plurality of SRS resources, the first DCI further carries the sounding reference signal resource indicator (SRI), and the SRI indicates an SRS resource that is in the plurality of SRS resources and that is associated with the first PUSCH.

For example, that the first SRS configuration includes configuration information of a plurality of SRS resources includes: The first SRS configuration includes one SRS resource set (for example, the first SRS resource set), and the SRS resource set includes a plurality of SRS resources. In another example, the first SRS configuration includes a plurality of SRS resource sets, and each SRS resource set includes a plurality of SRS resources.

In a possible implementation, the SRI further indicates an open-loop power control parameter and/or a closed-loop power control status of the first PUSCH.

In a possible implementation, the sending a first SRS on the first BWP based on the first SRS configuration includes: switching from a second BWP to the first BWP, and sending the first SRS on the first BWP based on the first SRS configuration. The second BWP is one of BWPs in which the one or more PUSCH configurations are located. A transmission power adjustment value of the first SRS is related to a transmission power adjustment value indicated by a transmission power control (TPC) command value (TPC command value) carried in DCI corresponding to one or more PUSCHs on the second BWP.

It may be understood that, for description of the transmission power adjustment of the first SRS, refer to the description in FIG. 5 or FIG. 6 below.

In a possible implementation, DCI corresponding to a PUSCH on the second BWP is not DCI used to schedule a PUSCH.

In a possible implementation, each of the one or more PUSCHs on the second BWP corresponds to one or more pieces of DCI.

In a possible implementation, the method further includes: A transmission power adjustment value of the first SRS is related to a transmission power adjustment value indicated by a TPC command value of TPC information carried in DCI received on each BWP of one or more BWPs; or, a transmission power adjustment value of the first SRS is related to a transmission power adjustment value indicated by a TPC command value of TPC information carried in DCI received by a terminal device on one or more configured carriers (CCs).

According to a second aspect, an embodiment of the present disclosure provides a data transmission method. The method includes:

sending configuration information, where the configuration information includes an association relationship between a first SRS configuration and one or more PUSCH configurations, and a first BWP in which the first SRS configuration is located is different from a BWP in which each PUSCH configuration is located; receiving a first SRS based on the first SRS configuration; and receiving a first PUSCH based on a first PUSCH configuration, where the first PUSCH configuration is one of the one or more PUSCH configurations.

In a possible implementation, the first SRS is used for positioning.

In a possible implementation, the first PUSCH configuration is further associated with a second SRS configuration, and the method further includes: sending first DCI, where the first DCI carries first indication information, and the first indication information indicates that the first PUSCH is associated with the first SRS configuration or is associated with the second SRS configuration.

In a possible implementation, the first SRS configuration includes configuration information of a plurality of SRS resources, the first DCI further carries a sounding reference signal resource indicator (SRI), and the SRI indicates an SRS resource that is in the plurality of SRS resources and that is associated with the first PUSCH.

In a possible implementation, the SRI further indicates an open-loop power control parameter and/or a closed-loop power control status of the first PUSCH.

According to a third aspect, an embodiment of the present disclosure provides a communication apparatus, configured to perform the method in any one of the first aspect or any possible implementation of the first aspect. The communication apparatus includes a corresponding unit for performing the method in any one of the first aspect or any possible implementation of the first aspect.

For example, the communication apparatus may be a terminal device, a chip in a terminal device, or the like.

According to a fourth aspect, an embodiment of the present disclosure provides a communication apparatus, configured to perform the method in any one of the second aspect or any possible implementation of the second aspect. The communication apparatus includes a corresponding method for performing the method in any one of the second aspect or any possible implementation of the second aspect.

For example, the communication apparatus may be an access network device, a chip in an access network device, or the like.

In the third aspect or the fourth aspect, the communication apparatus may include a sending unit, a receiving unit, and a processing unit. For specific descriptions of the sending unit, the receiving unit, and the processing unit, refer to apparatus embodiments shown below.

According to a fifth aspect, an embodiment of the present disclosure provides a communication apparatus. The communication apparatus includes a processor, configured to perform the method in any one of the first aspect or any possible implementation of the first aspect. Alternatively, the processor is configured to execute a program stored in a memory. When the program is executed, the method in any one of the first aspect or any possible implementation of the first aspect is performed.

For each of the foregoing communication apparatuses, in a process of performing the foregoing methods, a process of sending signaling or data in the foregoing methods may be understood as a process of outputting the signaling or data by the processor. When the processor outputs the signaling or data, the processor outputs the signaling or data to a transceiver, so that the transceiver transmits the signaling or data. After the signaling or data is output by the processor, other processing may further need to be performed before the signaling or data arrives at the transceiver. Similarly, when the processor receives the input signaling or data, the transceiver receives the signaling or data and inputs the signaling or data into the processor. Further, after the transceiver receives the signaling or data, other processing may need to be performed on the signaling or data before the signaling or data is input into the processor. It may be understood that, with respect to this description, the sixth aspect shown below is also applicable.

Operations such as transmitting, sending, and receiving related to the processor may be more usually understood as operations such as outputting, receiving, and inputting of the processor unless otherwise specified or if the operations do not conflict with an actual function or internal logic of the operations in related descriptions, but not operations such as transmitting, sending, and receiving directly performed by a radio frequency circuit and an antenna.

In an implementation process, the processor may be a processor specially configured to perform these methods, or a processor, for example, a general-purpose processor, that executes computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in this embodiment. It may be understood that descriptions of the processor and the memory are also applicable to the sixth aspect shown below.

In a possible implementation, the memory is located outside the communication apparatus.

In a possible implementation, the memory is located inside the communication apparatus.

In a possible implementation, the communication apparatus further includes a transceiver. The transceiver is configured to receive a signal or send a signal. For example, the transceiver may be further configured to receive configuration information, send a first SRS, and the like.

In this embodiment, the communication apparatus may be a terminal device, a chip in a terminal device, or the like.

According to a sixth aspect, an embodiment of the present disclosure provides a communication apparatus. The communication apparatus includes a processor, configured to perform the method in any one of the second aspect or any possible implementation of the second aspect. Alternatively, the processor is configured to execute a program stored in a memory. When the program is executed, the method in any one of the second aspect or any possible implementation of the second aspect is performed.

In a possible implementation, the memory is located outside the communication apparatus.

In a possible implementation, the memory is located inside the communication apparatus.

In a possible implementation, the communication apparatus further includes a transceiver. The transceiver is configured to receive a signal or send a signal. For example, the transceiver may be configured to send configuration information, receive a first SRS, and the like.

In this embodiment, the communication apparatus may be an access network device, a chip in an access network device, or the like.

According to a seventh aspect, an embodiment of the present disclosure provides a communication apparatus. The communication apparatus includes a logic circuit and an interface. The logic circuit is coupled to the interface. The interface is configured to input configuration information. The interface is further configured to output a first SRS and output a first PUSCH.

For example, the logic circuit is configured to parse the input configuration information, to obtain content in the configuration information. For example, the logic circuit is further configured to generate a first SRS based on a first SRS configuration, and output the first SRS through the interface. For example, the logic circuit is further configured to generate a first PUSCH based on a first PUSCH configuration, and output the first PUSCH through the interface.

It may be understood that to-be-processed data shown in the present disclosure may include configuration information. After processing the configuration information, obtaining the first SRS based on the first SRS configuration, and obtaining the first PUSCH (that is, processed data may include the first SRS and the first PUSCH) based on the first PUSCH configuration, the logic circuit outputs the first SRS and the first PUSCH through the interface.

For example, the logic circuit is further configured to control the interface to output the first PSUCH through an antenna port or an open-loop power control parameter or both that are the same as that of the first SRS.

For example, the interface is further configured to input first DCI.

For example, the logic circuit is further configured to switch from a second BWP to a first BWP, generate the first SRS based on the first SRS configuration, and output the first SRS through the interface. According to an eighth aspect, an embodiment of the present disclosure provides a communication apparatus. The communication apparatus includes a logic circuit and an interface. The logic circuit is coupled to the interface. The interface is configured to output configuration information. The interface is further configured to input a first SRS and input a first PUSCH.

For example, the logic circuit is configured to obtain configuration information, and output the configuration information through the interface.

According to a ninth aspect, an embodiment of the present disclosure provides a computer-readable storage medium. The computer-readable storage medium is configured to store a computer program. When the computer program is run on a computer, the method in any one of the first aspect or any possible implementation of the first aspect is performed.

According to a tenth aspect, an embodiment of the present disclosure provides a computer-readable storage medium. The computer-readable storage medium is configured to store a computer program. When the computer program is run on a computer, the method in any one of the second aspect or any possible implementation of the second aspect is performed.

According to an eleventh aspect, an embodiment of the present disclosure provides a computer program product. The computer program product includes a computer program or computer code. When the computer program product is run on a computer, the method in any one of the first aspect or any possible implementation of the first aspect is performed.

According to a twelfth aspect, an embodiment of the present disclosure provides a computer program product. The computer program product includes a computer program or computer code. When the computer program product is run on a computer, the method in any one of the second aspect or any possible implementation of the second aspect is performed.

According to a thirteenth aspect, an embodiment of the present disclosure provides a computer program. When the computer program is run on a computer, the method in any one of the first aspect or any possible implementation of the first aspect is performed.

According to a fourteenth aspect, an embodiment of the present disclosure provides a computer program. When the computer program is run on a computer, the method in any one of the second aspect or any possible implementation of the second aspect is performed.

According to a fifteenth aspect, an embodiment of the present disclosure provides a wireless communication system. The wireless communication system includes a terminal device and an access network device. The terminal device is configured to perform the method in any one of the first aspect or any possible implementation of the first aspect. The access network device is configured to perform the method in any one of the second aspect or any possible implementation of the second aspect.

BRIEF DESCRIPTION OF DRAWINGS

FIG. 4 to FIG. 6 each are a schematic flowchart of a data transmission method according to an embodiment of the present disclosure; and FIG. 7 to FIG. 9 each are a schematic diagram of a structure of a communication apparatus according to an embodiment of the present disclosure.

DESCRIPTION OF EMBODIMENTS

Figures 1A, 1B:
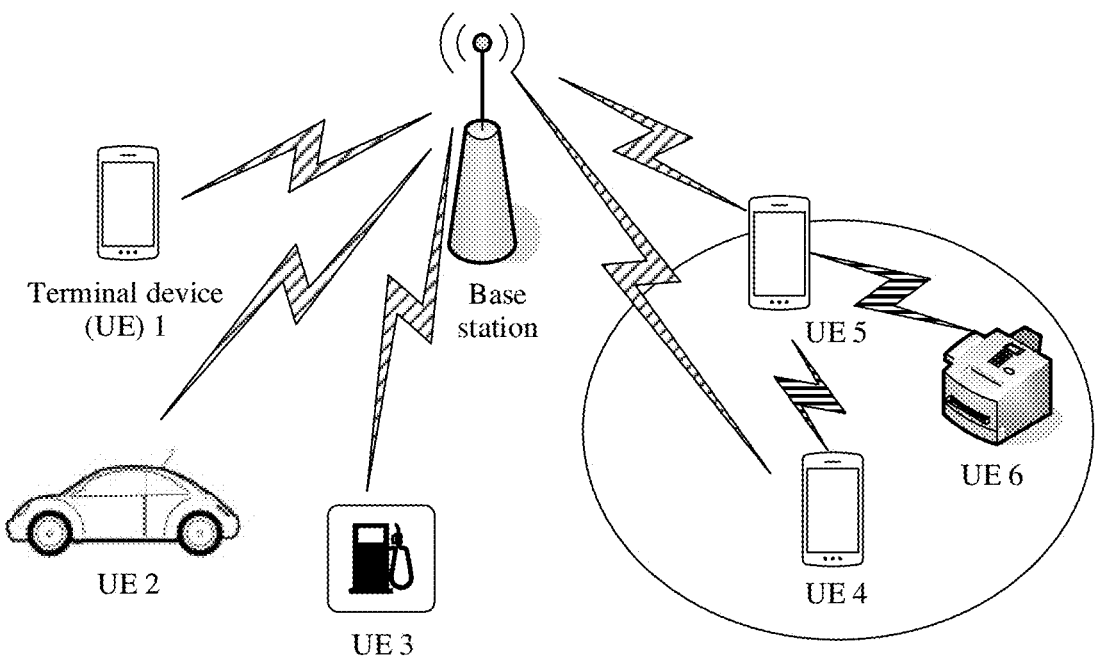
FIG. 1*a* is a schematic diagram of a communication system according to an embodiment of the present disclosure.
FIG. 1*b* is a schematic diagram of a positioning architecture based on a wireless communication system according to an embodiment of the present disclosure.

To make objectives, technical solutions, and advantages of the present disclosure clearer, the following further describes the present disclosure with reference to the accompanying drawings.

In the specification, claims, and the accompanying drawings of the present disclosure, terms such as "first" and "second" are only intended to distinguish between different objects but do not describe a particular order. In addition, terms "include", "have", or any other variant thereof are intended to cover a non-exclusive inclusion. For example, a process, a method, a system, a product, or a device that includes a series of steps or units is not limited to the listed steps or units, but optionally further includes an unlisted step, unit, or the like, or optionally further includes another step or unit inherent to the process, the method, the product, the device, or the like.

An "embodiment" mentioned in this specification means that a particular feature, structure, or characteristic described with reference to an embodiment may be included in at least one embodiment of the present disclosure. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In the present disclosure, "at least one (item)" means one or more, "a plurality of" means two or more, "at least two (items)" means two, three, or more, and "and/or" is used to describe an association relationship between associated objects and indicates that three relationships may exist. For example, "A and/or B" may indicate the following three cases: Only A exists, only B exists, and both A and B exist, where A and B may be singular or plural. The character "/" usually indicates an "or" relationship between associated objects. "At least one of the following items (pieces)" or a similar expression thereof means any combination of these items. For example, at least one (piece) of a, b, or c may represent: a, b, c, a and b, a and c, b and c, or a, b, and c.

The method provided in the present disclosure may be applied to various communication systems, for example, an internet of things (IoT) system, a narrow band internet of things (NB-IoT) system, a long term evolution (LTE) system, a 5th generation (5G) communication system, a new communication system (such as 6G) emerging in future communication development, and the like.

The technical solutions provided in the present disclosure may be further applied to machine type communication (MTC), a long term evolution-machine (LTE-M) technology, a device-to-device (D2D) network, a machine-to-machine (M2M) network, an internet of things (IoT) network, or another network. The IoT network may include, for example, an internet of vehicles. Communication manners in an internet of vehicles system are collectively referred to as vehicle-to-everything (V2X, where X may represent anything). For example, the V2X may include vehicle-to-vehicle (V2V) communication, vehicle-to-infrastructure (V2I) communication, vehicle-to-pedestrian (V2P) communication, vehicle-to-network (V2N) communication, or the like. For example, in FIG. 1*a* or FIG. 1*b* shown below, a terminal device may communicate with another terminal device by using a D2D technology, an M2M technology, a V2X technology, or the like.

FIG. 1*a* is a schematic diagram of a communication system according to an embodiment of the present disclosure. As shown in FIG. 1*a*, the communication system may include at least one access network device and at least one terminal device.

The access network device and the terminal device are separately described as follows.

For example, the access network device may be a next generation NodeB (gNB), a next generation evolved NodeB (ng-eNB), an access network device in future 6G communication, or the like. The access network device may be any device that has a wireless transceiver function, including but not limited to the base station shown above. Alternatively, the base station may be a base station in a future communication system such as a sixth generation communication system. Optionally, the access network device may be an access node, a wireless relay node, a wireless backhaul node, or the like in a wireless fidelity (Wi-Fi) system. Optionally, the access network device may be a radio controller in a cloud radio access network (CRAN) scenario. Optionally, the access network device may be a wearable device, an in-vehicle device, or the like. Optionally, the access network device may be a small cell, a transmission reception point (TRP) (or may be referred to as a transmission point), or the like. It may be understood that the access network device may alternatively be a base station or the like in a future evolved public land mobile network (PLMN).

In some deployments, a base station (for example, a gNB) may include a central unit (CU) and a distributed unit (DU). To be specific, functions of the base station in the access network are split, some functions of the base station are deployed on one CU, and remaining functions are deployed on the DU. In addition, a plurality of DUs share one CU, so that costs may be reduced and network expansion is easy. In some other deployments of the base station, the CU may be further divided into a CU-control plane (CP), a CU-user plane (UP), and the like. In still some other deployments of the base station, the base station may alternatively be an open radio access network (ORAN) architecture or the like. A specific type of the base station is not limited in the present disclosure.

For ease of description, the following describes the method related to the present disclosure by using an example in which the access network device is a base station.

For example, the terminal device may also be referred to as user equipment (UE), a terminal, or the like. The terminal device is a device that has a wireless transceiver function, and may be deployed on land, including an indoor or outdoor, handheld, wearable, or on-board deployment; or may be deployed on a water surface, for example, on a ship;

or may be deployed in the air, for example, deployed on an airplane, a balloon, a satellite, or the like. The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. It may be understood that the terminal device may alternatively be a terminal device in a future 6G network, a terminal device in a future evolved PLMN, or the like.

It may be understood that the terminal device shown in the present disclosure may not only include a vehicle (for example, an entire vehicle) in an internet of vehicles, but also include an in-vehicle device, an in-vehicle terminal, or the like in the internet of vehicles. A specific form of the terminal device used in the internet of vehicles is not limited in the present disclosure.

For ease of description, the following describes the method related to the present disclosure by using an example in which the terminal device is UE.

The communication system shown in FIG. 1a includes one base station and six UEs, for example, UE 1 to UE 6 in FIG. 1a. In the communication system, the base station may send a downlink signal such as configuration information or DCI to the UE 1 to the UE 6, and the UE 1 to the UE 6 may send an uplink signal such as an SRS or a PUSCH to the base station. It may be understood that, for a communication manner between the UEs, refer to the foregoing descriptions.

It should be understood that, for example, FIG. 1a shows one base station, six UEs, and communication links between the communication devices. Optionally, the communication system may include a plurality of base stations. In addition, in a coverage area of each base station, another quantity of UEs may be included, for example, more or fewer UEs. This is not limited in the present disclosure.

A plurality of antennas may be configured for each communication device, such as the base station and the UE 1 to the UE 6 in FIG. 1a. The plurality of antennas may include at least one transmitting antenna configured to send a signal, at least one receiving antenna configured to receive a signal, and the like. A specific structure of each communication device is not limited in this embodiment. Optionally, the communication system may further include another network entity such as a network controller or a mobility management entity. This is not limited in this embodiment.

It may be understood that the method provided in the present disclosure may be applied to not only the communication system shown in FIG. 1a, but also a communication system shown in FIG. 1b.

FIG. 1b is a schematic diagram of a positioning architecture based on wireless communication according to an embodiment of the present disclosure. As shown in FIG. 1b, the positioning architecture mainly includes three parts: a radio access network (RAN) (for example, a next generation RAN (NG-RAN) shown in FIG. 1b), UE, and a core network. For example, the core network includes a location management function (LMF), an access and mobility management function (AMF), a service location protocol (SLP), and an evolved serving mobile location center (E-SMLC).

For example, the LMF is responsible for supporting different types of location services related to the UE, including positioning the UE, transferring auxiliary data to the UE, and the like. For example, the LMF interacts with a base station through a new radio (NR) positioning protocol annex (NRPPa) message, to obtain a positioning reference signal (PRS), sounding reference signal (SRS) configuration information, cell timing, cell location information, and the like. For another example, UE capability information, auxiliary information, measurement information, and the like are transferred between the LMF and the UE through a long term evolution (LTE) positioning protocol (LTE positioning protocol, LPP) message.

For example, the AMF may receive, from a 5th generation core network location service (5GC LCS) entity, a location service request related to the UE; or the AMF may start some location services on behalf of the UE, and send the location service request to the LMF. After obtaining location information of the UE, the AMF returns the location information of the UE to the 5GC LCS entity.

For example, the RAN includes a base station. As shown in FIG. 1b, a gNB and a ng-eNB may be connected through an Xn interface (or an Xn-C interface), the LMF and the ng-eNB/gNB may be connected through an NG-C interface, the UE and the gNB may be connected through an NR-Uu interface, and the UE and the ng-eNB may be connected through an LTE-Uu interface. It may be understood that each interface shown in FIG. 1b is not limited in the present disclosure. For descriptions of each interface, refer to a related standard, protocol, or the like.

It may be understood that the schematic diagram of the positioning architecture shown in FIG. 1b is only an example. For a schematic diagram of another form of a positioning architecture, refer to a related standard, protocol, or the like.

The embodiments shown below may be applicable to the communication system shown in FIG. 1a, or may be applicable to the communication system shown in FIG. 1b.

Figure 2A:
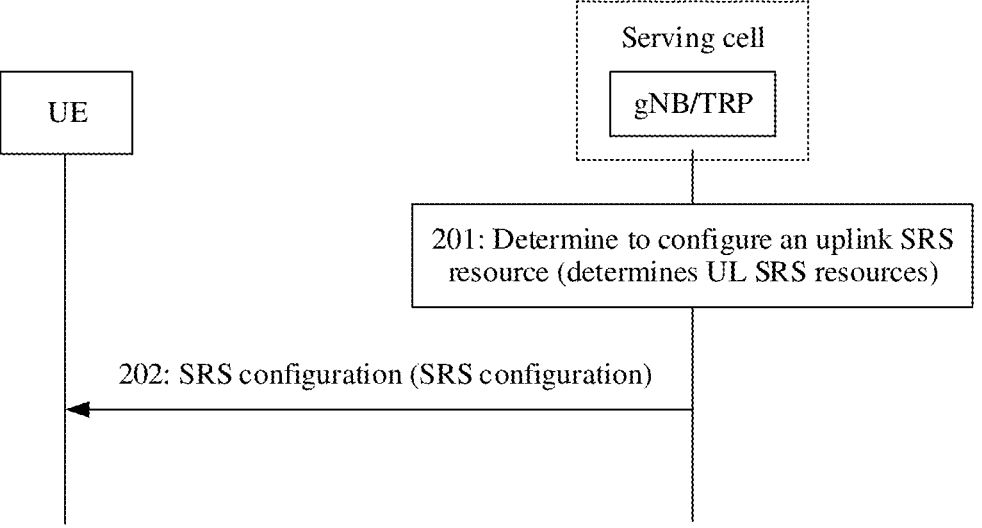
FIG. 2*a* is a schematic flowchart of a data transmission method according to an embodiment of the present disclosure.

FIG. 2a is a schematic flowchart of a data transmission method according to an embodiment of the present disclosure. As shown in FIG. 2a, the method includes the following steps.

201: A serving base station determines to configure an uplink SRS resource (determines UL SRS resources).

Figure 2B:
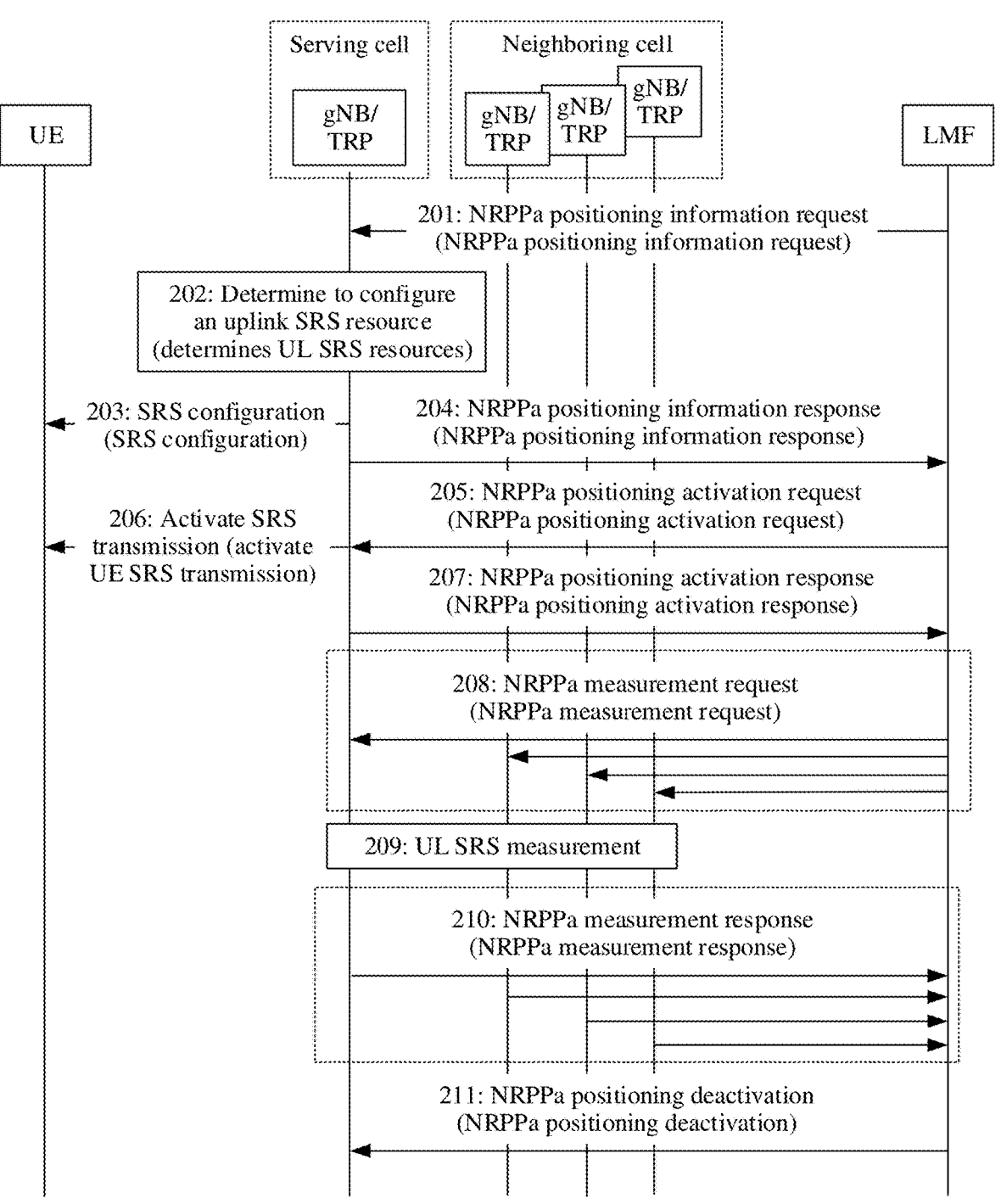
FIG. 2*b* is a schematic flowchart of a positioning-based data transmission method according to an embodiment of the present disclosure.

It may be understood that in the method shown in FIG. 2a and FIG. 2b, the serving base station may be a gNB, a TRP, or the like. This is not limited in this embodiment.

202: The serving base station sends a message carrying an SRS configuration to UE. Correspondingly, the UE receives the SRS configuration. The SRS configuration includes configuration information of the uplink SRS resource determined by the serving base station for the UE.

According to the method shown in FIG. 2a, the serving base station may send the SRS configuration to the UE, so that the UE may obtain the SRS configuration and send an SRS based on the SRS configuration.

FIG. 2b is a schematic flowchart of a positioning-based data transmission method according to an embodiment of the present disclosure. As shown in FIG. 2b, the method includes the following steps.

201: An LMF requests an SRS configuration from a serving base station of UE, for example, requests the SRS configuration through an NRPPa positioning information request message.

202: The serving base station determines to configure an uplink SRS resource (determines UL SRS resources).

203: The serving base station sends a message carrying the SRS configuration to the UE. Correspondingly, the UE receives the SRS configuration.

In this embodiment, the SRS configuration includes a configuration of the uplink SRS resource.

204: The serving base station sends a response carrying the SRS configuration to the LMF, for example, returns the SRS configuration to the LMF through an NRPPa positioning information response message. Correspondingly, the LMF receives the response.

Optionally, the serving base station may first send a message carrying the SRS configuration to the UE. Then, after the LMF requests the SRS configuration from the serving base station of the UE, the serving base station sends the response carrying the SRS configuration to the LMF. It may be understood that the SRS configuration sent by the serving base station to the UE may be the same as or different from the SRS configuration sent by the serving base station to the LMF. This is not limited in this embodiment. Optionally, the serving base station may alternatively first send a message carrying an SRS configuration 1 to the UE. After the LMF requests an SRS configuration from the serving base station of the UE, the serving base station determines to configure the uplink SRS resource, then sends a message carrying an SRS configuration 2 to the UE, and sends a response carrying the SRS configuration 2 to the LMF. It may be understood that the SRS configuration 2 and the SRS configuration 1 may be different or may be the same. This is not limited in this embodiment. A sequence of step 201 and step 202 is not limited in this embodiment. A sequence of step 203 and step 204 is not limited in this embodiment.

205: If an SRS is configured as an aperiodic or semi-persistent SRS, the LMF requests the serving base station of the UE to activate the SRS configuration, for example, requests to activate the SRS configuration through an NRPPa positioning activation request message. Correspondingly, the serving base station receives the NRPPa positioning activation request.

206: The serving base station sends an instruction for activating SRS transmission to the UE. Correspondingly, the UE receives the instruction.

It may be understood that although a step of sending the SRS by the UE is not shown in FIG. 2*b*, the method shown in FIG. 2*b* may further include the step of sending the SRS by the UE. When the UE sends the SRS is not limited in this embodiment.

207: The serving base station sends a response for activating the SRS configuration to the LMF, for example, sends the response for activating the SRS configuration to the LMF through an NRPPa positioning activation response message. Correspondingly, the LMF receives the response.

It may be understood that the response for activating the SRS configuration may be a high-level response message.

208: The LMF sends a measurement request to one or more base stations (which may include the serving base station, or may not include the serving base station), to request the one or more base stations to measure the SRS. For example, the LMF sends an NRPPa measurement request message to the one or more base stations to request to measure the SRS. It may be understood that the one or more base stations shown above may include a serving base station and/or a neighboring base station.

209: The serving base station or the neighboring base station or both perform UL SRS measurement. Correspondingly, the base station that receives the measurement request performs the UL SRS measurement.

210: The serving base station or the neighboring base station or both send an NRPPa measurement response to the LMF.

211: The LMF sends a request for deactivating the SRS configuration to the serving base station, for example, requests to deactivate the SRS configuration through an NRPPa positioning deactivation message.

It may be understood that the data transmission method shown in FIG. 2*b* includes a step of activating sending of the aperiodic or semi-persistent SRS. When sending of the aperiodic or semi-persistent SRS does not need to be activated (for example, a periodic SRS is used for positioning), the method provided in this embodiment may not include step 205 to step 207.

It may be understood that FIG. 2*b* shows a positioning method based on an uplink time difference of arrival (UL-TDOA). For a positioning method based on an uplink angle of arrival (UL-AoA), refer to FIG. 2*b*. For example, in the UL-TDOA-based positioning method, each cell measures an uplink relative time of arrival (UL-RTOA) of an SRS signal of the UE and reports a measurement result to the LMF. In the UL-AoA-based positioning method, each cell may measure an AoA of an SRS signal of the UE, and report a measurement result to the LMF. The method shown below in the present disclosure may also be applicable to a method based on a multi-cell round trip time (multi-RTT). For example, each cell measures an SRS signal of the UE, and reports a measurement result to the LMF. For specific descriptions of each foregoing positioning method, refer to a related standard, protocol, or the like. This is not limited in this embodiment.

In the method shown in FIG. 2*a* or FIG. 2*b*, the SRS configuration set by the serving base station needs to be included in a currently active BWP of the UE, so that the UE performs data transmission and SRS sending in a same uplink (UL) BWP.

In addition, when the UE performs BWP switching, a to-be-sent SRS also changes. For example, in a BWP switching method, the base station sends DCI to the UE on an original BWP (which may also be referred to as an old BWP), to schedule uplink and downlink data on a target BWP (which may also be referred to as a new BWP, or the like). Therefore, the UE switches to the target BWP, completes uplink data sending and/or downlink data receiving, and camps on the target BWP, until next DCI for BWP switching is received. When the UE camps on the target BWP, an SRS on the original BWP is no longer sent, but an SRS on the target BWP is sent.

Figure 3:
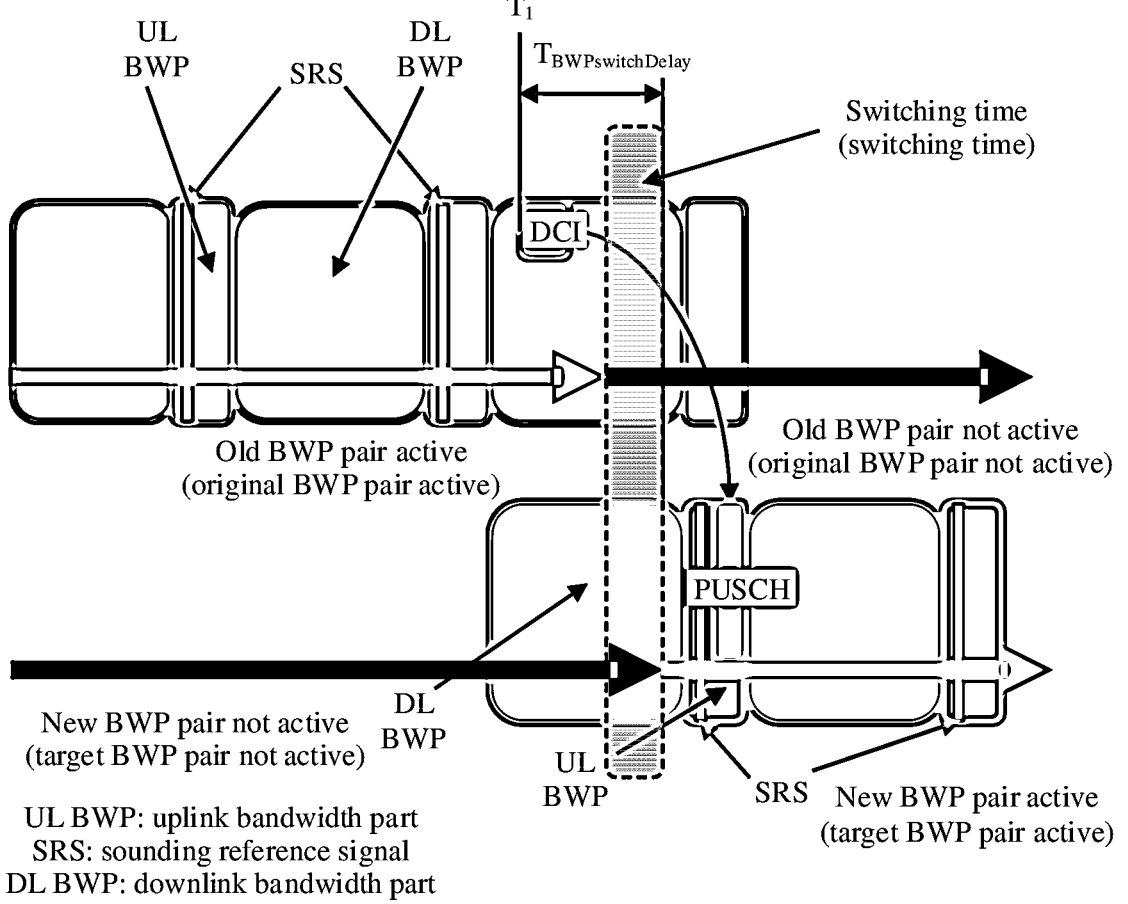
FIG. 3 is a schematic diagram of BWP switching according to an embodiment of the present disclosure.

Refer to FIG. 3. For example, the UE works in an original BWP pair (old BWP pair), including an original downlink BWP (old DL BWP) and an original uplink BWP (old UL BWP).

The UE listens to DCI on the old DL BWP. The DCI may be used to schedule the UE to receive a physical downlink shared channel (PDSCH) on the old DL BWP, schedule the UE to send a PUSCH on the old UL BWP, and schedule the UE to send an SRS on the old UL BWP. As shown by a gray arrow on the left in FIG. 3, the original BWP pair is in an active state (as shown by a black arrow on the left in FIG. 3, the target BWP is in an inactive state). The UE sends an SRS on the original BWP pair.

As shown in FIG. 3, at a moment T1, the UE receives DCI, and the DCI indicates the UE to send a PUSCH on a target uplink BWP (which may also be referred to as a new UL BWP). However, the UE needs a specific processing time to detect the corresponding DCI, that is, an actual time at which the UE detects the DCI, for example, $T1 + T_{DCI\text{-}process}$. When the UE determines, based on the DCI, that BWP switching needs to be performed, the UE enters a switching time (for example, a switching time shown in FIG. 3), to perform DL/UL synchronous switching (for a TDD spectrum). In other words, the UE needs to switch from the old BWP pair to the target BWP pair (new BWP pair) in the switching time. For example, during BWP switching, radio frequency (RF) retuning and loading of a BWP configuration on the new BWP pair are included. For example, the loaded configuration may include a control resource set (CORESET) configuration, a search space (SS) configuration, a PDSCH configuration, a PUSCH configuration, an SRS configuration, and the like on a new BWP. It may be understood that the UE may complete switching at a moment T1+$T_{BWPSwitchingDelay}$ at the latest. For a specific description of $T_{BWPSwitchingDelay}$, refer to a related standard, protocol, or the like. It is ensured that the PUSCH on the new UL BWP is scheduled after T1+$T_{BWPSwitchingDelay}$ by using the DCI at the moment T1, so that the UE can have time to send the PUSCH on the new UL BWP. As shown by a gray arrow on the right in FIG. 3, after the target BWP is switched to, the target BWP pair is in an active state (a black arrow on the right indicates that the original BWP pair is in an inactive state).

It may be understood that the foregoing BWP switching method is shown by using a time-division duplexing (TDD) spectrum as an example. For example, for a frequency-division duplexing (FDD) spectrum, BWP switching needs to be separately performed in an uplink and a downlink. For example, switching of a downlink BWP does not cause switching of an uplink BWP. It may be understood that specific descriptions of the TDD spectrum and the FDD spectrum are also applicable to the embodiments shown below.

In the foregoing method, the UE can send the SRS only on the currently active BWP. Therefore, it can be learned from the method shown in FIG. 3 that, before receiving the DCI, the UE sends the SRS on the original BWP. Because different BWPs correspond to different frequencies and bandwidths, channel information on the different BWPs is usually independent. Therefore, the base station cannot infer channel information of another new BWP based on channel information of an old BWP. Further, the base station cannot obtain channel information (which may also be referred to as a channel status) of the new BWP on the old BWP, and a modulation and coding scheme (MCS) of a corresponding PUSCH cannot be accurately obtained.

In view of this, the present disclosure provides a data transmission method and an apparatus. In this way, a base station may obtain channel information of a BWP other than a currently active BWP of UE, the base station may determine that the UE switches to an appropriate BWP (which may also be referred to as a target BWP), and the base station may flexibly select data for scheduling.

Usually, during BWP switching, both radio frequency retuning (RF retuning) and a BWP configuration may need to be switched. For example, one or more of a control resource set (CORESET) configuration of the BWP, an SS configuration of the BWP, a PDSCH configuration, a PUSCH configuration, or an SRS configuration need to be switched.

The following describes a PUSCH configuration and an SRS configuration in detail.

I. The PUSCH configuration indicates configuration information related to a PUSCH. For example, the PUSCH configuration may include one or more of a time-frequency resource allocation status of the PUSCH, an MCS of the PUSCH, a DMRS configuration, and a mapping relationship between an open-loop power control parameter of the PUSCH and an SRI. For example, the PUSCH configuration includes a time-frequency resource allocation table of the PUSCH, and then a field (for example, four bits or five bits)

in DCI indicates an entry in the table, to determine a slot occupied by the PUSCH, a symbol index in the slot, and the like. It may be understood that the description of the PUSCH configuration shown in the present disclosure is only an example. For specific content of the PUSCH configuration, refer to a related standard, protocol, or the like. It may be understood that a PUSCH closed-loop power control status 1 and a PUSCH closed-loop power control status 2 shown below are only examples. In some implementations, the PUSCH closed-loop power control status 1 shown in the present disclosure may also be referred to as a PUSCH closed-loop power control status 0 (or n0, i0, or the like), and the PUSCH closed-loop power control status 2 may also be referred to as a PUSCH closed-loop power control status 1 (or n1, i1, or the like).

In the present disclosure, a method for determining a PUSCH closed-loop power control status may be as follows.

1. For a PUSCH dynamically scheduled, if a parameter SRI-PUSCH-PowerControl (which may also be referred to as a high-level configuration parameter) is set for the base station, the parameter includes sri-PUSCH-PowerControlId and sri-PUSCH-ClosedLoopIndex.

For example, a format of the parameter SRI-PUSCH-PowerControl is shown as follows:

```
SRI-PUSCH-PowerControl ::=          SEQUENCE {
    sri-PUSCH-PowerControlId            SRI-PUSCH-
                                        PowerControlId,
    sri-PUSCH-PathlossReferenceRS-Id    PUSCH-
                                        PathlossReferenceRS-Id,
    sri-P0-PUSCH-AlphaSetId             P0-PUSCH-AlphaSetId,
    sri-PUSCH-ClosedLoopIndex            ENUMERATED { i0, i1 }
```

For example, sri-PUSCH-PowerControlId indicates a value corresponding to an SRI field in DCI, or may be understood as follows: The parameter is used to match a value of an SRI field in the DCI, or may be understood as an index of a power control parameter. The index is used to match the value of the SRI field in the DCI. sri-PUSCH-PathlossReferenceRS-Id indicates a path loss reference signal index of the power control parameter, sri-P0-PUSCH-AlphaSetId indicates an index of a P0 or alpha value set, and sri-PUSCH-ClosedLoopIndex indicates an index of the PUSCH closed-loop power control status.

If the DCI includes the SRI field, SRI-PUSCH-Power-Control whose sri-PUSCH-PowerControlId is equal to an SRI field value is searched for and a value of sri PUSCH-CloseLoopIndex is found. For example, if the SRI field is a first value, when sri-PUSCH-PowerControlId is equal to the first value, a corresponding value of sri_PUSCH-CloseLoopIndex is obtained from SRI-PUSCH-PowerControl. If the value is i0, the current PUSCH closed-loop power control status is 1. If the value is i1, the current PUSCH closed-loop power control status is 2. A corresponding PUSCH closed-loop power control status is subject to an increase or decrease of a TPC command value in DCI.

If the DCI does not include the SRI field, the PUSCH closed-loop power control status is 1.

2. If the parameter SRI-PUSCH-PowerControl is not set for the base station, the PUSCH closed-loop power control status is 1.

3. For a grant-free/configured grant PUSCH, the PUSCH closed-loop power control status is determined by parameter pre-configuration scheduling configuration information (configuredGrantConfig).

II. The SRS configuration indicates configuration information related to an SRS.

For example, the SRS configuration includes configuration information of one or more SRS resources, or includes configuration information of one or more SRS resource sets. One SRS resource set includes one or more SRS resources. An SRS resource is used to configure an SRS.

For example, the SRS resource may be understood as a configuration unit whose granularity is smaller than that of the SRS configuration. When the SRS is used for multiple input multiple output (MIMO), the SRS resource may be used for codebook-based transmission (codebook) or non-codebook-based transmission (non-codebook).

For example, there may be two closed-loop power control statuses of a PUSCH.

Therefore, the SRS configuration may include a relationship between a closed-loop power control status of the SRS and a closed-loop power control status of the PUSCH. For example, the closed-loop power control status of the SRS may be consistent with a PUSCH closed-loop power control status 1, or the closed-loop power control status of the SRS may be consistent with a PUSCH closed-loop power control status 2, or the closed-loop power control status of the SRS may be an independent power control status. The closed-loop power control status of the SRS may be used to determine a TPC command value for sharing the PUSCH or use an independent TPC command value. For example, if the closed-loop power control status of the SRS is consistent with the PUSCH closed-loop power control status 1 or the PUSCH closed-loop power control status 2, the SRS may determine a transmission power adjustment value of the SRS based on a TPC command value carried in DCI used to schedule the PUSCH or based on a TPC command value carried in DCI not used to schedule the PUSCH. A format of the DCI used to schedule the PUSCH may be DCI format 0-0 (which may also be referred to as DCI 0-0, format 0-0, 0-0, or the like for short), DCI format 0-1 (which may also be referred to as DCI 0-1, format 0-1, 0-1, or the like for short), or DCI format 0-2 (which may also be referred to as DCI 0-2, format 0-2, 0-2, or the like for short).

A format of the DCI not used to schedule the PUSCH may be DCI 2-2. If the closed-loop power control status of the SRS is consistent with the PUSCH closed-loop power control status 1, a transmission power closed-loop adjustment value of the SRS is consistent with a power adjustment of the PUSCH closed-loop power control status 1 determined by a TPC command value of the PUSCH closed-loop power control status 1. If the closed-loop power control status of the SRS is consistent with the PUSCH closed-loop power control status 2, a transmission power closed-loop adjustment value of the SRS is consistent with a power adjustment of the PUSCH closed-loop power control status 2 determined by a TPC command value of the PUSCH closed-loop power control status 2. For another example, if the closed-loop power control status of the SRS is an independent power control status, the transmission power adjustment value of the SRS is not related to a TPC command value of PUSCH closed-loop power control, but is consistent with a power adjustment determined by a TPC command value in DCI format 2-3 (which may also be referred to as DCI 2-3, format 2-3, or the like for short).

It is determined that the closed-loop power control status of the PUSCH scheduled by using the current DCI is 1 or 2, so that the UE may control (or determine), based on the TPC command value of the PUSCH, the transmission power adjustment value of the SRS whose closed-loop power control status is consistent with the PUSCH closed-loop power control status.

It may be understood that, for descriptions of a first SRS configuration and a second SRS configuration shown below, refer to the description of the SRS configuration herein. In addition, for a first PUSCH configuration shown below, refer to the description of the PUSCH configuration herein.

Figures 4, 5:
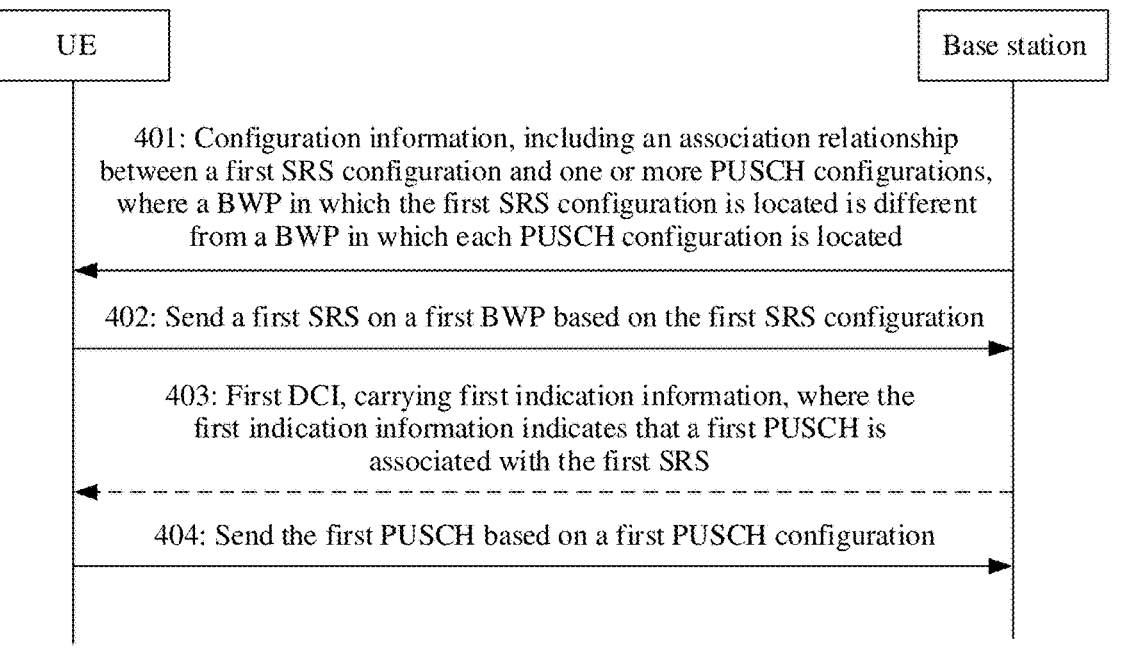

FIG. 4 is a schematic flowchart of a data transmission method according to an embodiment of the present disclosure. As shown in FIG. 4, the method includes the following steps.

401: A base station sends configuration information to UE, and correspondingly, the UE receives the configuration information, where the configuration information includes an association relationship between a first SRS configuration and one or more PUSCH configurations, and a first BWP in which the first SRS configuration is located is different from a BWP in which each PUSCH configuration is located.

For example, the configuration information includes an association relationship. The association relationship means the association relationship between the first SRS configuration and the one or more PUSCH configurations. For example, the configuration information includes an index of the first SRS configuration and an index of each PUSCH configuration in the one or more PUSCH configurations. That is, the association relationship between the first SRS configuration and the one or more PUSCH configurations is reflected by using indexes. For another example, the configuration information includes an index of the first SRS configuration and an index of the one or more PUSCH configurations. A difference between the two examples lies in that each PUSCH configuration corresponds to one index, or the one or more PUCSH configurations correspond to one index. It may be understood that the method for reflecting an association relationship by using an index is only an example. It may be understood that the index shown in the present disclosure may alternatively be replaced with an identifier or the like. This is not limited in this embodiment. It may be understood that, for the description of the association relationship, refer to Method 1 to Method 7 shown below.

For example, the configuration information includes the first SRS configuration and/or the one or more PUSCH configurations. In this case, the association relationship between the first SRS configuration and the one or more PUSCH configurations may be indicated by information in the first SRS configuration, indicated by information in the one or more PUSCH configurations, or the like. For example, when the information in the first SRS configuration is used for indication, the first SRS configuration may include the index of each PUSCH configuration in the one or more PUSCH configurations, or include the index of the one or more PUSCH configurations. For another example, when the information in the one or more PUSCH configurations is used for indication, some or all PUSCH configurations in the one or more PUSCH configurations may include the index of the first SRS configuration. It may be understood that, for the description of the association relationship, refer to Method 1 to Method 7 shown below.

For example, the configuration information not only includes the association relationship, but also includes the first SRS configuration and/or the one or more PUSCH configurations.

It may be understood that, in this embodiment, specific content of the configuration information may further include an association relationship configuration method shown below. For specific descriptions of the first SRS configuration and a first PUSCH configuration, refer to the foregoing descriptions.

Usually, a BWP in which a PUSCH configuration is located is the same as a BWP in which an SRS configuration (for example, a second SRS configuration) associated with the PUSCH configuration is located. However, in this embodiment, a BWP in which the first SRS configuration set in the configuration information is located is different from a BWP in which each PUSCH configuration (for example, including the first PUSCH configuration) is located. If the BWP in which the first SRS configuration is located is a first BWP, the first BWP may be in the following manner: The first BWP is a special BWP. The first BWP is referred to as the special BWP because a PUSCH or PUCCH or both are not configured on the first BWP, but a PUSCH or a PUCCH or both are configured on at least one BWP on a carrier (CC) in which the first BWP is located. In an example, a bandwidth size of the first BWP is a bandwidth of one carrier (for example, a carrier on which a first PUSCH is located). In another example, a bandwidth resource of the first BWP includes at least a part of bandwidth resources of a BWP in which the first PUSCH configuration is located.

In another example, the first SRS configuration is independent of any BWP. In this example, the first SRS configuration does not include an index of any BWP, and is not included in any BWP configuration.

It may be understood that the first BWP shown herein is only an example, and a specific implementation of the first BWP is not limited in this embodiment. In this embodiment, the BWP in which a first SRS is located may be a first BWP, or may be a plurality of first BWPs. This is not limited in this embodiment.

402: The UE sends a first SRS on the first BWP based on the first SRS configuration. Correspondingly, the base station receives the first SRS based on the first SRS configuration.

For example, the UE may send the first SRS or the like based on time domain and a time frequency of the first SRS configuration. The first SRS configuration is not limited in this embodiment.

The first SRS is used for multiple input multiple output (MIMO), or the first SRS is used for positioning. In other words, the first SRS shown in this embodiment may be an SRS in MIMO, or may be an SRS in positioning. For example, when the first SRS is used for positioning, a function of the first SRS may be shown in FIG. 2b. A specific description of positioning is not limited in this embodiment.

For example, if a currently active BWP of the UE is a second BWP, step 402 may alternatively be replaced with the following:

switching from the second BWP to the first BWP, and sending the first SRS on the first BWP based on the first SRS configuration. The second BWP is one of BWPs associated with the one or more PUSCH configurations associated with the first SRS configuration.

In other words, the UE may autonomously jump out of the currently active BWP (that is, the second BWP) to send the first SRS (for example, periodically send the first SRS). Alternatively, when receiving DCI for triggering an aperiodic SRS (for example, the first SRS), the UE may jump out of the currently active BWP to send the first SRS. The DCI for triggering the aperiodic SRS shown herein may also be understood as DCI used to trigger sending of an aperiodic SRS (for example, the first SRS), or the DCI is used to trigger sending of an aperiodic SRS (for example, the first SRS). For example, the DCI for triggering the aperiodic SRS may be in a format 2-3 or may be another format. This is not limited in this embodiment.

It may be understood that both the first BWP and the second BWP are uplink BWPs. Optionally, the first BWP and the second BWP are on a same carrier.

404: The UE sends the first PUSCH based on the first PUSCH configuration. The first PUSCH configuration is one of the one or more PUSCH configurations. Correspondingly, the base station receives the first PUSCH based on the first PUSCH configuration.

It may be understood that, for description of the first PUSCH configuration, refer to the foregoing description of the PUSCH configuration.

An association relationship between the first SRS configuration and the first PUSCH configuration is set in the configuration information. Therefore, when sending the first PUSCH, the UE may send the first PUSCH through an antenna port that is the same as that of the first SRS, and/or send the first PUSCH by using an open-loop power control parameter that is the same as that of the first SRS. It may be understood that the antenna port shown herein may be a logical antenna port, or may be a physical antenna port.

The following describes methods for configuring the association relationship in detail.

Method 1

That the configuration information includes an association relationship between a first SRS configuration and one or more PUSCH configurations may be replaced with that the configuration information includes an association relationship between the first SRS configuration and one or more BWPs. To be specific, a BWP in which the one or more PUSCH configurations are located is the one or more BWPs, and one BWP may be configured with one or two or more PUSCH configurations. Therefore, the first SRS configuration may include an index of the one or more BWPs associated with the first SRS configuration. The first SRS configuration includes the index of the one or more BWPs, so that the UE may learn that the first SRS configuration is associated with a PUSCH configuration on the one or more BWPs. It may be understood that, in the method, when the first SRS configuration includes the index of the one or more BWPs associated with the first SRS configuration, the first SRS configuration may be associated with each PUSCH configuration on the one or more BWPs.

For Method 1, the configuration information may be understood as: including the first SRS configuration. The first SRS configuration includes the index of the one or more BWPs associated with the first SRS configuration. Optionally, the configuration information further includes the PUSCH configuration on the one or more BWPs. Optionally, the PUSCH configuration (for example, which may be referred to as one or more PUCSH configurations) on the one or more BWPs or may also be included in another information. For example, after sending the configuration information to the UE, the base station sends information including the one or more PUSCH configurations again. The one or more PUSCH configurations are located on the one or more BWPs. For another example, the base station may first send the information including the one or more PUSCH configurations to the UE, and then send the configuration information.

Method 2

For example, the first SRS configuration includes configuration information of one or more SRS resources, or configuration information of one or more SRS resource sets. For example, the one or more SRS resource sets include a first SRS resource set, and the one or more SRS resources include a first SRS resource. Optionally, the first SRS resource may be included in the first SRS resource set.

Optionally, the first SRS resource is an SRS resource associated with the first PUSCH configuration (which is only an example). Optionally, the first SRS resource set is an SRS resource set associated with the first PUSCH configuration (which is only an example).

For example, when the BWP in which the first SRS configuration is located is a first BWP, the association relationship may be represented as follows: Each PUSCH configuration includes an index of the first SRS resource or an index of the first SRS resource set. Alternatively, the association relationship may be represented as follows: The first PUSCH configuration includes an index of the first SRS resource or an index of the first SRS resource set. In this case, if the first SRS configuration includes a plurality of SRS resource sets, indexes of SRS resources in each of the plurality of SRS resource sets may be different. For example, an SRS resource 1, an SRS resource 2, an SRS resource 3, and an SRS resource 4 are configured on the first BWP in which the first SRS configuration is located. The SRS resource 1 and the SRS resource 2 may be included in an SRS resource set a, and the SRS resource 3 and the SRS resource 4 may be included in an SRS resource set b.

For example, the configuration information may be understood as: including the one or more PUSCH configurations. Each PUSCH configuration includes the index of the first SRS resource or the index of the first SRS resource set. Alternatively, the configuration information may be understood as: including the first PUSCH configuration. The first PUSCH configuration includes the index of the first SRS resource or the index of the first SRS resource set. The PUSCH configuration includes the index of the first SRS resource or the index of the first SRS resource set, so that the UE may learn that the PUSCH configuration is associated with the first SRS resource in the first SRS configuration (or associated with the first SRS resource set), or the UE may learn that the BWP in which the PUSCH configuration is located is associated with the first SRS resource (or associated with the first SRS resource set).

For example, when the BWP in which the first SRS configuration is located is a first BWP of the plurality of first BWPs, for example, when indexes of resource sets on different BWPs are the same, the association relationship may be represented as follows: Each PUSCH configuration includes an index of the first BWP and the index of the first SRS resource set. For another example, when indexes of SRS resources in different SRS resource sets are the same, the association relationship may be represented as follows: Each PUSCH configuration includes the index of the first BWP, the index of the first SRS resource set, and the index of the first SRS resource. For another example, when indexes of resource sets on different BWPs are different, the association relationship may be represented as follows: Each PUSCH configuration includes the index of the first SRS resource set. For another example, when indexes of SRS resources in different SRS resource sets are different, the association relationship may be represented as follows: Each PUSCH configuration includes the index of the first SRS resource. It may be understood that the description of the PUSCH configuration is also applicable to the first PUSCH configuration. It may be understood that, for description of the configuration information, refer to the foregoing descriptions.

Optionally, besides that the configuration information includes the one or more PUSCH configurations and the first SRS resource or the first SRS resource set associated with each PUSCH configuration, the configuration information may further include a first SRS configuration. The first SRS configuration includes configuration information of the first SRS resource or configuration information of the first SRS resource set. Optionally, the first SRS configuration may also be included in another information. For specific descriptions of the another information and the first SRS configuration, refer to the descriptions of the another information and the one or more PUSCH configurations in Method 1.

Method 3

In Method 1, although the first SRS configuration is associated with the one or more BWPs, because more than one PUSCH configuration may be set on one BWP, whether the one or more PUSCH configurations set on each BWP are associated with the first SRS configuration may be indicated by DCI. For example, first DCI needs to indicate whether the first PUSCH obtained based on the first PUSCH configuration is associated with the first SRS configuration or is associated with the second SRS configuration.

For example, the first SRS configuration may include second indication information. In this case, the second indication information may indicate that whether the first SRS configuration is associated with a PUSCH configuration needs to be further determined based on DCI. The PUSCH configuration (including the first PUSCH configuration) is located on the one or more BWPs associated with the first SRS configuration. For example, the second indication information indicates that whether the first PUSCH obtained based on the PUSCH configuration is associated with the first SRS configuration is determined based on the first DCI.

For example, the second indication information is included in configuration information of a first SRS resource set. In this case, the second indication information indicates that whether the first SRS resource set is associated with a PUSCH configuration needs to be determined based on DCI. Alternatively, the second indication information indicates that whether the first SRS resource set is associated with the first PUSCH obtained based on the first PUSCH configuration needs to be determined based on DCI used to schedule the first PUCSH. For example, if the first SRS configuration is associated with the one or more BWPs, whether the one or more PUSCH configurations associated on each BWP are associated with the first SRS resource set needs to be further determined based on DCI. For another example, the first SRS configuration includes a second SRS resource set. When the second SRS resource set does not include the second indication information, it may indicate that whether the second SRS resource set is associated with a PUSCH configuration does not need to be determined based on DCI. In this case, whether the one or more PUSCH configurations associated on each BWP are associated with the second SRS resource set may not be determined based on DCI. For example, the one or more PUSCH configurations associated on each BWP may be associated with the second SRS resource set.

For example, the second indication information may be included in the first SRS resource. In this case, the second indication information indicates that whether the first SRS resource is associated with a PUSCH configuration needs to be determined based on DCI. For example, the second indication information indicates that whether the first SRS resource is associated with the first PUSCH obtained based on the first PUSCH configuration needs to be determined based on the first DCI. Optionally, with reference to Method 3 and Method 1, the configuration information may be understood as: including the first SRS configuration. The first SRS configuration includes an index of the one or more BWPs associated with the first SRS configuration. Optionally, the first SRS configuration includes the second indication information. Optionally, the first SRS resource set included in the first SRS configuration includes the second indication information. Optionally, the first SRS resource included in the first SRS configuration includes the second indication information. Optionally, the configuration information may further include the one or more PUSCH configurations on the one or more BWPs.

Optionally, with reference to Method 3 and Method 2, the configuration information may be understood as: including the one or more PUSCH configurations. Each PUSCH configuration includes an index of the first SRS resource, and the first SRS resource includes the second indication information. Alternatively, each PUSCH configuration includes an index of the first SRS resource set, and the first SRS resource set includes the second indication information.

In another example, the configuration information may include the one or more PUSCH configurations. Each PUSCH configuration includes an index of the first SRS resource and the second indication information, or each PUSCH configuration includes an index of the first SRS resource set and the second indication information.

Method 4

The first SRS configuration includes a bit length of a DCI indication field. The bit length of the DCI indication field may be understood as a bit length of an indication field in DCI.

For example, when second indication information is included in the first SRS configuration, the DCI indication field (for example, the indication field specifically carries first indication information) indicates whether the first PUSCH configuration (or the first PUSCH obtained based on the first PUSCH configuration) is associated with the first SRS configuration. For example, the indication field indicates that the first PUSCH configuration (or the first PUSCH obtained based on the first PUSCH configuration) is associated with the first SRS configuration, or the indication field indicates that the first PUSCH configuration is not associated with the first SRS configuration. Optionally, the indication field indicates that the first PUSCH configuration is associated with the first SRS configuration, or the indication field indicates that the first PUSCH configuration is associated with the second SRS configuration. The first indication information indicates whether the first PUSCH configuration is associated with the first SRS configuration, or the first indication information indicates that the first PUSCH configuration is associated with the first SRS configuration or is associated with the second SRS configuration.

For example, when the second indication information is included in a first SRS resource set, the DCI indication field indicates whether the first PUSCH configuration (or the first PUSCH obtained based on the first PUSCH configuration) is associated with the first SRS resource set. Alternatively, the indication field indicates that the first PUSCH configuration (or the first PUSCH obtained based on the first PUSCH configuration) is associated with the first SRS resource set, or is associated with a second SRS resource set, or is associated with another SRS resource set. The second SRS resource set is included in the first SRS configuration, and the another SRS resource set is included in the second SRS configuration. Correspondingly, the first indication information indicates an SRS resource set associated with the first PUSCH configuration. For example, the SRS resource set associated with the first PUSCH configuration is the first SRS resource set, or the second SRS resource set, or the another SRS resource set.

For example, when the second indication information is included in a first SRS resource, the DCI indication field indicates whether the first PUSCH configuration (or the first PUSCH obtained based on the first PUSCH configuration) is associated with the first SRS resource, or the indication field indicates that the first PUSCH configuration (or the first PUSCH obtained based on the first PUSCH configuration) is associated with the first SRS resource, or is associated with a resource in the second SRS resource set, or is associated with another resource. The second SRS resource set is included in the first SRS configuration, and the another resource is included in the second SRS configuration. Correspondingly, the first indication information indicates an SRS resource associated with the first PUSCH configuration. For example, an SRI in DCI indicates the SRS resource associated with the first PUSCH configuration. For example, the first SRS configuration includes the bit length, for example, one bit or two bits. In this case, for example, a correspondence between a value of the indication field and an association relationship may be preset, may be predefined in a standard, or the like. This is not limited in this embodiment. Alternatively, a correspondence between a value of the indication field and an association relationship between the first PUSCH and the SRS configuration (including the first SRS configuration, the second SRS configuration, or the like) may be preset, pre-defined in a standard, or the like. It may be understood that the first PUSCH and the SRS configuration shown herein are only examples. For example, an association relationship between the first PUSCH and a resource set or an association relationship between the first PUSCH and a resource may be further included.

Optionally, the first SRS configuration may further include a correspondence between a value of the indication field and an association relationship. Alternatively, the first SRS configuration may further include a correspondence between a value of the indication field and an association relationship between the first PUSCH and the SRS configuration (including the first SRS configuration, the second SRS configuration, or the like). For example, when the value of the indication field is 00, it indicates that the first PUSCH scheduled by using the DCI is associated with the first SRS configuration. When the value of the indication field is 11, it indicates that the first PUSCH scheduled by using the DCI is associated with the second SRS configuration. For example, for the indication field with the one bit, when the value of the indication field is 0, it indicates that the first PUSCH scheduled by using the DCI is not associated with the first SRS configuration. For example, when the value of the indication field is 1, it indicates that the first PUSCH scheduled by using the DCI is associated with the first SRS configuration. In other words, the DCI includes the indication field, and the value of the indication field is 1. The UE may determine, based on the value of the indication field, that the first PUSCH is associated with the first SRS configuration. It may be understood that I shown herein may also be referred to as the first indication information. For another example, when the value of the indication field is 1, it indicates that the first PUSCH scheduled by using the DCI is associated with the first SRS configuration.

It may be understood that Method 4 may be combined with Method 3. For example, if the first SRS configuration includes the second indication information, it indicates that DCI corresponding to the first PUSCH needs to include an indication field, and a bit length of the indication field is included in the first SRS configuration. It may be understood that, in this embodiment, where the bit length of the indication field is included is not limited. For example, the bit length of the indication field may further be included in the first SRS resource set or the like in the first SRS configuration.

Method 5

For example, the first SRS configuration may include a plurality of SRS resources, or include a plurality of SRS resource sets. Therefore, whether the SRS resources or the SRS resource sets included in the first SRS configuration are associated with a PUSCH configuration may also be indicated by DCI. For example, second indication information may be included in the PUSCH configuration. For example, the second indication information is included in the first PUSCH configuration. In this case, the second indication information indicates that an association between the first PUSCH configuration and an SRS resource or an SRS resource set in the first SRS configuration needs to be further determined based on DCI. For example, the one or more PUSCH configurations associated with the first SRS configuration further include a second PUSCH configuration. If the second PUSCH configuration does not include the second indication information, it may indicate that the second PUSCH configuration may be associated with all SRS resources or all SRS resource sets in the first SRS configuration.

Method 6

The PUSCH configuration includes a bit length of a DCI indication field. The bit length of the DCI indication field may be understood as a bit length of an indication field in DCI.

For example, the indication field indicates whether the first PUSCH configuration (or the first PUSCH obtained based on the first PUSCH configuration) is associated with a first SRS resource set. Alternatively, the indication field indicates an SRS resource set associated with the first PUSCH configuration (or the first PUSCH obtained based on the first PUSCH configuration). With reference to first indication information, for example, the first indication information may indicate an SRS resource set associated with the first PUSCH configuration. For example, the SRS resource set associated with the first PUSCH configuration is the first SRS resource set, or a second SRS resource set, or another SRS resource set.

For example, the indication field indicates whether the first PUSCH configuration is associated with a first SRS resource. Alternatively, the indication field indicates an SRS resource associated with the first PUSCH configuration. For example, an SRI in DCI indicates the SRS resource associated with the first PUSCH configuration.

It may be understood that, for description of the bit length of the DCI indication field, refer to the descriptions in Method 4.

For example, a difference between Method 4 and Method 6 may be as follows: For example, when the first SRS configuration includes the bit length of the DCI indication field, DCI on any BWP may include an indication field. When the PUSCH configuration includes the bit length of the DCI indication field, DCI used to schedule a PUSCH on an active BWP may include an indication field, and DCI for scheduling a PUSCH on another BWP may not include the indication field.

Method 7

Both the first SRS configuration and the PUSCH configuration do not include explicit indication information. That is, the explicit indication information does not indicate the association relationship between the first SRS configuration and the one or more PUSCH configurations. Instead, the configuration information implicitly indicates the association relationship between the first SRS configuration and the one or more PUSCH configurations. For example, when the configuration information includes the first SRS configuration and the one or more PUSCH configurations, it may be understood that each PUSCH configuration is associated with the first SRS configuration. For another example, with reference to Method 1 and Method 7, the configuration information includes the first SRS configuration. When the first SRS configuration includes one or more BWP indexes, it indicates that the first SRS is associated with each PUSCH configuration on the one or more BWPs.

It may be understood that Method 1 to method 7 may be independent methods, or the seven methods may be combined with each other. For example, Method 1 and Method 4 are combined. For another example, Method 1, Method 3, and Method 4 are combined. For another example, Method 1, Method 3, and Method 6 are combined. For another example, Method 1, Method 4, and Method 5 are combined. For another example, Method 2, Method 5, Method 6, and the like are combined. Details are not listed one by one herein.

According to Method 4 or Method 6, when the first SRS configuration is associated with one or more BWPs and there is a plurality of PUSCH configurations on the one or more BWPs, it may be determined, based on the first indication information in the DCI, that the first SRS configuration is associated with the first PUSCH configuration. Alternatively, when the first SRS configuration is associated with a plurality of PUSCH configurations and a PUSCH configuration in the plurality of PUSCH configurations is further associated with the second SRS configuration, it may be determined, based on the first indication information, that the PUSCH configuration (for example, the first PUSCH configuration) is associated with the first SRS configuration. In other words, it may be clearly determined, based on the first indication information in the DCI, that the first PUSCH is sent through an antenna port or an open-loop power control parameter or both that are the same as that of the first SRS. In this case, the method shown in FIG. 4 may further include the following step.

403: The base station sends the first DCI to the UE, where the first DCI carries the first indication information, and the first indication information indicates that the first PUSCH is associated with the first SRS. Correspondingly, the UE receives the first DCI.

The first DCI is used to schedule the first PUSCH. When the first SRS configuration includes configuration information of a plurality of SRS resources, the first DCI may further carry an SRI. The SRS indicates an SRS resource that is in the plurality of SRS resources and that is associated with the first PUSCH. For example, the SRI may have different values. That is, different values may correspond to different SRS resources. Therefore, the UE may learn, based on a value of the SRI, that the first PUSCH is associated with one of the plurality of SRS resources. It may be understood that when the first DCI does not include the SRI, the first PUSCH may be associated with a $1^{st}$ SRS resource of the plurality of SRS resources. Alternatively, when the first SRS configuration only includes configuration information of one SRS resource, the first DCI may not include an SRI.

Optionally, the SRI in the first DCI further indicates an open-loop power control parameter of the first PUSCH. The open-loop power control parameter may include PO, alpha, or the like. For a specific description of the open-loop power control parameter, refer to a related standard or protocol (for example, 3GPP TS 38.213 or 3GPP TS 38.331). This is not limited herein. Optionally, when the first DCI does not include the SRI, a default open-loop power control parameter may be used. The default open-loop power control parameter is not limited in this embodiment.

Optionally, the SRI in the first DCI further indicates a closed-loop power control status of the first PUSCH, for example, the closed-loop power control status 1 or 2 of the first PUSCH. It may be understood that the method for indicating a closed-loop power control status of the first PUSCH shown herein is only an example. For the method for determining the closed-loop power control status of the first PUSCH, refer to the foregoing descriptions.

It may be understood that step 403 is shown by using an example in which the first DCI includes the first indication information.

However, in step 403, the first DCI may not include the first indication information. To be specific, the first DCI may not carry an explicit bit (for example, Method 7), and the first PUSCH is associated with the first SRS configuration by default. When the first PUSCH is associated with the second SRS configuration, the first DCI may carry another indication information, to indicate that the first PUSCH is associated with the second SRS configuration. Alternatively, when a transmission mode of the first PUSCH configuration is consistent with usage (usage) of the first SRS configuration, the first PUSCH is associated with the first SRS configuration by default. When the transmission mode of the first PUSCH configuration is inconsistent with the usage of the first SRS configuration, the first PUSCH is by default associated with an SRS configuration that is set on a BWP in which the first PUSCH is located and that is consistent with the usage.

In the method shown in FIG. 2a or FIG. 2b, when the UE performs BWP switching, the UE still sends the first SRS on the original BWP, so that the base station cannot obtain the channel information on the target BWP. However, in this embodiment, when sending the first SRS, the UE may not only jump out of the currently active BWP of the UE, but also send the first SRS on the first BWP. In addition, sending of the first SRS may not be affected by BWP switching. In other words, the first SRS is sent regardless of a BWP in which the UE is located. To be specific, in this embodiment, the first SRS independent of data scheduling may be used, so that the first SRS is independent of sending of an SRS for data BWP switching. In this way, the base station may obtain channel information (which may also be referred to as a channel status) on a to-be-switched BWP before the UE performs BWP switching.

Further, the first SRS may be further used for positioning. A positioning signal requires a bandwidth as large as possible, and a bandwidth of a data service of the UE may be smaller than a bandwidth of the positioning signal. In this embodiment, the first SRS with a large positioning bandwidth is also used for communication, so that overheads on a network side may be reduced.

Usually, when a transmission power of a PUSCH needs to be adjusted, a base station may use a TPC command value to indicate a transmission power adjustment value of the PUSCH to UE. Therefore, with reference to the method shown in FIG. 4, the following describes in detail a method for determining a transmission power adjustment value of a first SRS.

It may be understood that the TPC command value shown below may indicate an accumulated value of power adjustment, or may indicate an absolute value of power adjustment. For example, when TPC-accumulation is not configured in RRC signaling, the TPC command value indicates an accumulated value of the transmission power adjustment value. For another example, when TPC-accumulation is configured in an RRC, the TPC command value indicates an absolute value of the transmission power adjustment value. The absolute value of the transmission power adjustment value shown herein means that the TPC command value indicates an offset value of a current power adjustment value. That is, the transmission power adjustment value may be irrelevant to a previously received TPC command value. The accumulated value of the transmission power adjustment value means that the transmission power adjustment value is not only related to a current TPC command value, but also needs to be related to the previously received TPC command value. It may be understood that, for specific descriptions of the accumulated value and the absolute value, refer to a related standard, protocol (for example, 3GPP TS 38.213), or the like. This is not limited in the present disclosure.

Implementation 1

When a closed-loop power control status of a first SRS is consistent with a PUSCH closed-loop power control status 1 or a PUSCH closed-loop power control status 2, the transmission power adjustment value of the first SRS may be determined by using the following methods.

DCI may indicate a TPC command value of a PUSCH, and is used to control a transmission power of the PUSCH. For example, when a closed-loop power control status of the PUSCH is consistent with the closed-loop power control status of the first SRS, the TPC command value of the PUSCH is also applicable to the first SRS. For example, a power adjustment value (single or accumulated) of the PUSCH is consistent with a power adjustment value (single or accumulated) of the first SRS. It may be understood that the DCI shown herein is used to schedule a PUSCH on a second BWP. For example, the DCI may be the first DCI shown above, or may be DCI received before or after the first DCI. The second BWP shown in this embodiment may be understood as an active BWP of UE. The original BWP or the target BWP shown in FIG. 3 may be referred to as a second BWP. For example, the UE may send uplink data and/or receive downlink data through the second BWP.

Method 1: The transmission power adjustment value of the first SRS is related to a transmission power adjustment value indicated by a TPC command value carried in DCI (for example, one PUSCH corresponds to one piece of DCI) corresponding to one or more PUSCHs on the second BWP.

For description of the second BWP, refer to the method shown in FIG. 4.

For example, DCI corresponding to a PUSCH (a PUSCH whose power control status is consistent with that of the first SRS) on the second BWP is DCI used to schedule the PUSCH. For example, a DCI format is DCI0-0, DCI0-1, or DCI0-2. For example, the transmission power adjustment value of the first SRS is related only to a transmission power adjustment value indicated by a TPC command value carried in DCI0-0, DCI0-1, or DCI0-2 corresponding to one or more PUSCHs (a PUSCH whose power control status is consistent with that of the first SRS) on the second BWP.

For example, DCI corresponding to a PUSCH (a PUSCH whose power control status is consistent with that of the first SRS) on the second BWP is not DCI used to schedule the PUSCH. For example, a DCI format is DCI2-2. The DCI corresponding to the PUSCH (the PUSCH whose power control status is consistent with that of the first SRS) on the second BWP shown in this embodiment may be DCI used to control a power of the PUSCH. For example, the transmission power adjustment value of the first SRS is related only to a transmission power adjustment value indicated by a TPC command value carried in DCI2-2 corresponding to one or more PUSCHs (a PUSCH whose power control status is consistent with that of the first SRS) on the second BWP.

For example, each PUSCH in the one or more PUSCHs (a PUSCH whose power control status is consistent with that of the first SRS) on the second BWP corresponds to one or more pieces of DCI. The one or more pieces of DCI may include DCI used to schedule a PUSCH, or may include DCI not used to schedule a PUSCH. In other words, the transmission power adjustment value of the first SRS is related to a transmission power adjustment value indicated by a TPC command value carried in each of the one or more pieces of DCI corresponding to each PUSCH (the PUSCH whose power control status is consistent with that of the first SRS) in the one or more PUSCHs on the second BWP. For example, the transmission power adjustment value of the first SRS may be a sum of the transmission power adjustment value indicated by the TPC command value carried in each of the plurality of pieces of DCI shown herein.

The PUSCH on the second BWP shown in this embodiment may have an association relationship with the first SRS, or may not have an association relationship with the first SRS. This is not limited in this embodiment. In other words, in the method shown in FIG. 4, a first PUSCH has an association relationship with the first SRS. Therefore, the first PUSCH may be sent through an antenna port that is the same as that of the first SRS. When a transmission power of the first SRS is adjusted, the transmission power adjustment value of the first SRS is related to a TPC command value indicated by DCI corresponding to a PUSCH whose closed-loop power control status is consistent with the closed-loop power control status of the first SRS.

It may be understood that, for a specific description of the transmission power adjustment value of the first SRS, refer to the method shown in FIG. 5.

In this embodiment, the power control adjustment value of the first SRS may be maintained by a single BWP, for example, maintained by the second BWP. In this way, when performing BWP switching, the UE may reload an accumulated power control value of the first SRS corresponding to the second BWP. Further, it is ensured that the power adjustment value of the first SRS is consistent with that of the PUSCH on the second BWP.

Method 2: The transmission power adjustment value of the first SRS is related to a transmission power adjustment value indicated by a TPC command value carried in DCI corresponding to one or more PUSCHs (a PUSCH whose power control status is consistent with that of the first SRS). The one or more PUSCHs are located on one or more BWPs associated with the first SRS.

As shown above, a first SRS configuration may include one or more BWP indexes. Therefore, the transmission power adjustment value of the first SRS may be related to a transmission power adjustment value indicated by a TPC command value carried in DCI corresponding to the one or more PUSCH (a PUSCH whose power control status is consistent with that of the first SRS). The one or more PUSCHs are located on the one or more BWPs included in the first SRS configuration. For example, the transmission power adjustment value of the first SRS may be a sum of the transmission power adjustment value indicated by the TPC command value carried in the DCI corresponding to the one or more PUSCHs.

As shown above, configuration information may include an association relationship between the first SRS configuration and one or more PUSCH configurations. Therefore, Method 2 shown in this embodiment may also be understood as follows: The transmission power adjustment of the first SRS may be related to a transmission power adjustment value indicated by a TPC command value carried in each piece of DCI in DCI corresponding to one or more PUSCHs (a PUSCH whose power control status is consistent with the first SRS) corresponding to the one or more PUSCH configurations.

For example, the transmission power adjustment value of the first SRS may be a sum of the transmission power adjustment value indicated by the TPC command value carried in the DCI corresponding to the one or more PUSCHs.

In this embodiment, the first SRS is subject to TPC superposition of PUSCHs on different BWPs. Therefore, it is ensured that a transmission power of the first SRS does not suddenly change when the UE performs BWP switching.

Method 3: The transmission power adjustment value of the first SRS is reset to 0 during BWP switching. A difference between Method 3 and Method 1 lies in that: In Method 1, if BWP #1-BWP #2-BWP #1 switching is performed for a plurality of times, a power adjustment value on the BWP #1 for a first time continues to take effect when the BWP #1 is switched to for a second time; and in Method 3, the power adjustment value is reset to 0 when the BWP #1 is switched to for the second time. For a specific description of Method 3, refer to Method 1. In this embodiment, the power control adjustment value of the first SRS may be reset during the BWP switching, to ensure that the transmission power of the PUSCH is not affected when the power adjustment of the first SRS is reset.

It may be understood that, for specific descriptions or examples of Method 1 to Method 3, refer to FIG. 5 shown below.

FIG. 5 is a schematic flowchart of a data transmission method according to an embodiment of the present disclosure. As shown in FIG. 5, the method includes the following steps.

501: A base station sends configuration information to UE, and correspondingly, the UE receives the configuration information, where the configuration information includes an association relationship between a first SRS configuration and one or more PUSCH configurations, and a first BWP in which the first SRS configuration is located is different from a BWP in which each PUSCH configuration is located.

502: The UE sends a first SRS on the first BWP based on the first SRS configuration. Correspondingly, the base station receives the first SRS based on the first SRS configuration.

503: The base station sends first DCI to the UE, where the first DCI carries first indication information, and the first indication information indicates that a first PUSCH is associated with the first SRS. Correspondingly, the UE receives the first DCI.

The first DCI may indicate a TPC command value of the first PUSCH. When a closed-loop power control status of the first PUSCH is consistent with a closed-loop power control status of the first SRS, the TPC command value of the first PUSCH is also applicable to the first SRS. For example, a power adjustment value (single or accumulated) of the first PUSCH is consistent with a power adjustment value (single or accumulated) of the first SRS.

504: The UE sends the first PUSCH based on a first PUSCH configuration. The first PUSCH configuration is one of the one or more PUSCH configurations. Correspondingly, the base station receives the first PUSCH based on the first PUSCH configuration.

For example, the UE may send the first PUSCH on a second BWP. That is, in step 504, a currently active BWP of the UE is the second BWP.

It may be understood that, for specific descriptions of step 501 to step 504, refer to FIG. 4 shown above.

505: The UE sends the first SRS to the base station on the first BWP based on the first SRS configuration. Correspondingly, the base station receives the first SRS based on the first SRS configuration.

506: The base station sends second DCI to the UE, and the UE receives the second DCI, where the second DCI is used to schedule a first PUSCH on a third BWP, and the third BWP is different from a BWP in which the first PUSCH is located.

It may be understood that the second DCI may also indicate UL BWP switching, or before step 506, the UE has performed UL BWP switching based on another method, for example, receiving downlink DCI. That is, the first PUSCH scheduled in step 506 and the first PUSCH scheduled in step 503 are not on a same BWP. For example, the second DCI in step 506 may be DCI used for BWP switching. Alternatively, before step 506, an uplink/downlink BWP pair has been switched by using another method (for example, another DCI).

Optionally, the second DCI may further indicate a TPC command of the first PUSCH, to control a power of the PUSCH. When the closed-loop power control status of the first PUSCH is consistent with the closed-loop power control status of the first SRS, the TPC command value of the first PUSCH is also applicable to the first SRS, and the power adjustment value (single or accumulated) based on the first PUSCH is consistent with the power adjustment value (single or accumulated) of the first SRS.

507: The UE sends the first PUSCH based on the first PUSCH configuration. Correspondingly, the base station receives the first PUSCH based on the first PUSCH configuration.

For example, the UE may send the first PUSCH on the third BWP. That is, in step 507, a currently active BWP of the UE is the third BWP. It may be understood that the second BWP and the third BWP may be considered as BWPs associated with the first SRS.

508: The UE sends the first SRS on the first BWP based on the first SRS configuration. Correspondingly, the base station receives the first SRS based on the first SRS configuration.

With reference to the method shown in FIG. 5, Method 1 to Method 3 are described as an example.

For example, for Method 1, power adjustment of the first SRS is not performed across BWPs. For example, a transmission power of the first SRS in step 502 is 15 dBm, and the TPC command value in the first DCI in step 503 instructs to increase the transmission power by 1 dB (for example, only the first PUSCH on the second BWP is controlled). In this case, the transmission power of the first SRS in step 505 is 16 dBm (namely, 15 dBm+1 dB). For another example, if the TPC command value in the second DCI in step 506 instructs to increase the transmission power by 3 dB (only the first PUSCH on the third BWP is controlled), the transmission power of the first SRS in step 508 is 18 dBm (namely, 15 dBm+3 dB).

For example, for Method 2, if the transmission power of the first SRS in step 502 is 15 dBm and the TPC command value in the first DCI in step 503 instructs to increase the transmission power by 1 dB (only the first PUSCH on the second BWP is controlled), the transmission power of the first SRS in step 505 is 16 dBm. For another example, the TPC command value in the second DCI in step 506 instructs to increase the transmission power by 3 dB (only the first PUSCH on the third BWP is controlled). Because both the second BWP and the third BWP are BWPs associated with the first SRS, the transmission power of the first SRS in step 508 is 19 dBm (15 dBm+1 dB+3 dB).

Implementation 2

A closed-loop power control status of a first SRS is an independent power control status. In this case, a transmission power adjustment value of the first SRS may be determined by using the following methods.

Method 1: The power adjustment value of the first SRS is related to a transmission power adjustment value indicated by a TPC command value in DCI that is received on one or more BWPs and that is in a format 2-3.

In an embodiment, the one or more BWPs and a first SRS configuration belong to a same carrier. In another embodiment, the one or more BWPs include one or more fourth BWPs. The fourth BWP and the first SRS configuration belong to different carriers. However, a TPC command carried in DCI that is in the format 2-3 and that is received on a carrier of the fourth BWP may be applied to a carrier on which the first SRS configuration is located. In another example, the one or more BWPs may be understood as one or more BWPs in which one or more PUSCH configurations are located and that is associated with the first SRS configuration. A corresponding BWP may be understood as a BWP bound to the one or more BWPs, or may be understood as a downlink BWP paired with the one or more BWPs. The transmission power adjustment value of the first SRS is a sum of a transmission power adjustment value indicated by the TPC command value carried in the DCI (the DCI format is 2-3) received on each BWP on the one or more BWPs.

Alternatively, Method 1 may be replaced with the following: The transmission power adjustment value of the first SRS is related to a transmission power adjustment value indicated by a TPC command carried in DCI (the DCI format is 2-3) received on one or more carriers CCs configured for the UE. The one or more CCs shown herein may be all CCs or some CCs configured for the UE. In an example, the one or more CCs may include: a CC on which the first SRS configuration is located, and/or a CC (for example, a CC on which carrier aggregation is performed with the CC on which the first SRS configuration is located) bound to the CC on which the first SRS configuration is located. For example, the transmission power adjustment value of the first SRS may be a sum of the transmission power adjustment value indicated by the TPC command carried in the DCI (the DCI format is 2-3) received on the one or more CCs.

For example, in FIG. 6 shown below, a transmission power adjustment value of a first SRS in step 606 may be a sum of transmission power adjustment values indicated by third DCI in step 603 and step 605. For example, the third DCI is received on a second BWP in step 603, and the third DCI is received on a third BWP in step 605.

Method 2: The power adjustment value of the first SRS is related to a transmission power adjustment value indicated by a TPC command in DCI that is in a format 2-3 and that is received on a BWP corresponding to a second BWP.

For example, the BWP corresponding to the second BWP shown herein may be understood as a BWP bound to the second BWP, or a downlink BWP paired with the second BWP, or a currently active BWP of the UE.

For example, in FIG. 6 shown below, a transmission power adjustment value of a first SRS in step 604 may be related only to third DCI in step 603 (the currently active BWP of the UE is a second BWP). For another example, a transmission power adjustment value of the first SRS in step 606 may be related only to the third DCI in step 605 (the currently active BWP of the UE is a third BWP).

Method 3: The power adjustment value of the first SRS is reset to 0 during BWP switching.

It may be understood that, for specific descriptions of Method 2 and Method 3, refer to the descriptions in Implementation 1. It should be understood that a DCI format in Method 1 in Implementation 1 is DCI0-0, DCI0-1, DCI0-2, or DC02-2. However, a DCI format in Method 2 in Implementation 2 is DCI2-3. It may be understood that the DCI formats shown in embodiments of the present disclosure are only examples. If DCI in another format may also implement the method provided in embodiments of the present disclosure, the DCI in the another format also falls within the protection scope of the present disclosure.

With reference to the methods, FIG. 6 is a schematic flowchart of a data transmission method according to an embodiment of the present disclosure. As shown in FIG. 6, the method includes the following steps.

601: A base station sends configuration information to UE, and correspondingly, the UE receives the configuration information, where the configuration information includes an association relationship between a first SRS configuration and one or more PUSCH configurations, and a first BWP in which the first SRS configuration is located is different from a BWP in which each PUSCH configuration is located.

602: The UE sends a first SRS on the first BWP based on the first SRS configuration. Correspondingly, the base station receives the first SRS.

It may be understood that although FIG. 6 does not show a detailed description of first DCI or a first PUSCH in embodiments of the present disclosure, the method shown in FIG. 6 includes a step of sending, by the UE, the first PUSCH based on a first PUSCH configuration. In other words, in the method shown in FIG. 6, when sending the first PUSCH, the UE may send the first PUSCH through an antenna port or an open-loop power control parameter or both that are the same as that of the first SRS.

603: The base station sends third DCI to the UE. Correspondingly, the UE receives the third DCI.

604: The UE sends the first SRS on the first BWP based on the first SRS configuration. Correspondingly, the base station receives the first SRS.

605: The base station sends the third DCI to the UE. Correspondingly, the UE receives the third DCI.

606: The UE sends the first SRS on the first BWP based on the first SRS configuration. Correspondingly, the base station receives the first SRS.

In this embodiment, the third DCI carries a TPC command value used to adjust the first SRS. In other words, the third DCI may be used to adjust TPC of the first SRS. Optionally, the third DCI may also be used to trigger sending of an aperiodic SRS (for example, the first SRS).

For example, an explicit bit is added to DCI in a format 2-3 (namely, the third DCI) to indicate the DCI format 2-3, which is used to control a transmission power adjustment value of the first SRS and trigger sending of the first SRS (aperiodic). For example, for the explicit bit with one bit, when a value of the explicit bit is 0, it indicates that the DCI format 2-3 is used to control another SRS (for example, a second SRS obtained based on a second SRS configuration) on a currently active BWP of a carrier. When a value of the explicit bit is 1, it indicates that the DCI format 2-3 is used to control a first SRS on a first BWP of the carrier.

In other words, for a carrier configured with the first SRS, when the DCI format 2-3 is used to trigger SRS power adjustment and sending on the carrier, a TPC command value carried in the DCI format 2-3 may be used to control a transmission power adjustment value of the first SRS on the carrier. The DCI format 2-3 may be used to trigger sending of the first SRS.

For example, the transmission power adjustment value of the first SRS and sending of the first SRS are implicitly indicated. For example, when the configuration information includes the association relationship between the first SRS configuration and the one or more PUSCH configurations, the DCI format 2-3 is used to control the transmission power adjustment value of the first SRS on the carrier and trigger sending of the first SRS (aperiodic). When the configuration information does not include the association relationship between the first SRS configuration and the one or more PUSCH configurations, the DCI format 2-3 is used to control the transmission power adjustment value of the another SRS on the currently active BWP of the carrier and trigger carrier switching of the another SRS.

It may be understood that, in the foregoing embodiments, for an implementation that is not described in detail in an embodiment, refer to another embodiment.

The following describes a communication apparatus provided in embodiments of the present disclosure.

In the present disclosure, division into functional modules may be performed on the communication apparatus based on the foregoing method embodiments. For example, each functional module may be obtained through division based on each corresponding function, or two or more functions may be integrated into one processing module. The integrated module may be implemented in a form of hardware, or may be implemented in a form of a software functional module. It needs to be noted that in the present disclosure, module division is an example and is merely logical function division. During actual implementation, there may be another division manner. The following describes in detail a communication apparatus in embodiments of the present disclosure with reference to FIG. 7 to FIG. 9.

FIG. 7 is a schematic diagram of a structure of a communication apparatus according to an embodiment of the present disclosure. As shown in FIG. 7, the communication apparatus includes a processing unit 701, a receiving unit 702, and a sending unit 703.

The communication apparatus may be the terminal device shown above, a chip in the terminal device, or the like. To be specific, the communication apparatus may be configured to perform a step, a function, or the like performed by the terminal device (or the UE) in the foregoing method embodiments.

The receiving unit 702 is configured to receive configuration information.

The sending unit 703 is further configured to send a first SRS and send a first PUSCH.

It may be understood that the processing unit 701 is configured to send the first SRS on a first BWP based on a first SRS configuration by using the sending unit 703. The processing unit 701 is configured to send the first PUSCH based on a first PUSCH configuration by using the sending unit 703. Alternatively, the processing unit and the sending unit may be understood as follows: The processing unit 701 is configured to obtain the first SRS based on the first SRS configuration, and the sending unit 703 is configured to output the first SRS. The processing unit 701 is further configured to obtain the first PUSCH based on the first PUSCH configuration, and the sending unit 703 is further configured to output the first PUSCH.

In a possible implementation, the processing unit 701 is specifically configured to send the first PUSCH through an antenna port or an open-loop power control parameter or both that are the same as that of the first SRS via the sending unit 703.

In a possible implementation, the receiving unit 702 is further configured to receive first DCI.

In a possible implementation, the sending unit 703 is specifically configured to switch from a second BWP to the first BWP by using the processing unit 701, and send the first SRS on the first BWP based on the first SRS configuration.

Refer to FIG. 7 again. The communication apparatus may be the access network device shown above, a chip in the access network device, or the like. To be specific, the communication apparatus may be configured to perform a step, a function, or the like performed by the access network device in the foregoing method embodiments.

The sending unit 703 is configured to send configuration information.

The receiving unit 702 is further configured to receive a first SRS and receive a first PUSCH.

For example, the processing unit 701 may be configured to obtain the configuration information, and send the configuration information by using the sending unit 703.

For example, the receiving unit 702 may receive the first SRS based on a first SRS configuration by using the processing unit 701, and receive the first PUSCH based on a first PUSCH configuration by using the processing unit 701.

In embodiments of the present disclosure, for descriptions of the configuration information, the first BWP, the second BWP, the first SRS configuration, the PUSCH configuration, the first SRS and the first PUSCH, first indication information or second indication information, and the like, refer to the descriptions in the foregoing method embodiments.

It may be understood that specific descriptions of the sending unit, the receiving unit, and the processing unit shown in embodiments of the present disclosure are merely examples. For a specific function, step, or the like performed by the sending unit, the receiving unit, and the processing unit, refer to the foregoing method embodiments.

The foregoing describes the terminal device and the access network device in embodiments of the present disclosure. The following describes possible product forms of the terminal device and the access network device. It should be understood that a product in any form and having a function of the terminal device in FIG. 7 or a product in any form and having a function of the access network device in FIG. 7 falls within the protection scope of embodiments of the present disclosure. It should further be understood that the following descriptions are merely examples, and do not limit product forms of the terminal device and the access network device in embodiments of the present disclosure.

For example, the processing unit 701 may be one or more processors, the sending unit 703 may be a transmitter, and the receiving unit 702 may be a receiver, or the sending unit 703 and the receiving unit 702 are integrated into one device, for example, a transceiver. Alternatively, the processing unit 701 may be one or more processors (or the processing unit 701 may be one or more logic circuits), the sending unit 703 may be an output interface, and the receiving unit 702 may be an input interface, or the sending unit 703 and the receiving unit 702 are integrated into one unit, for example, an input/output interface. Details are described below.

In a possible implementation, in the communication apparatus shown in FIG. 7, the processing unit 701 may be one or more processors, and the sending unit 703 and the receiving unit 702 may be integrated into a transceiver. In embodiments of the present disclosure, the processor and the transceiver may be coupled, or the like. A connection manner between the processor and the transceiver is not limited in embodiments of the present disclosure.

Figure 8:
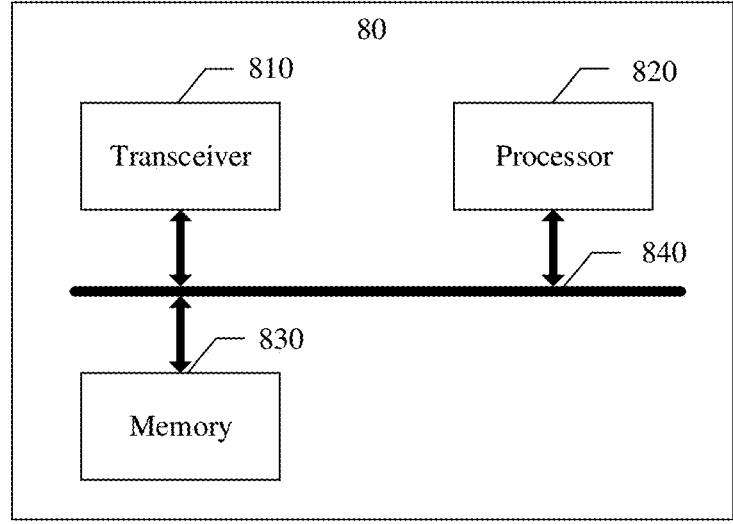

As shown in FIG. 8, a communication apparatus 80 includes one or more processors 820 and a transceiver 810.

For example, when the communication apparatus is configured to perform a step, a method, or a function performed by the terminal device, the transceiver 810 is configured to receive configuration information from an access network device, and the transceiver 810 is further configured to send a first SRS and a first PUSCH. For example, the transceiver 810 may send the first SRS on a first BWP based on a first SRS configuration by using the processor 820, and send the first PUSCH based on a first PUSCH configuration.

For example, when the communication apparatus is configured to perform a step, a method, or a function performed by the access network device, the transceiver 810 is configured to send configuration information, and the transceiver 810 is further configured to receive a first SRS and receive a first PUSCH.

For example, the processor 820 may be configured to obtain configuration information. The transceiver 810 is configured to send the configuration information to a terminal device, and receive a first SRS and a first PUSCH from the terminal device.

It may be understood that, for specific descriptions of the processor and the transceiver, refer to the descriptions of the processing unit, the sending unit, and the receiving unit shown in FIG. 7.

In various implementations of the communication apparatus shown in FIG. 8, the transceiver may include a receiver and a transmitter, the receiver is configured to perform a receiving function (or operation), and the transmitter is configured to perform a transmitting function (or operation). In addition, the transceiver is configured to communicate with other devices/apparatuses through a transmission medium.

Optionally, the communication apparatus 80 may further include one or more memories 830, configured to store program instructions and/or data. The memory 830 is coupled to the processor 820. The coupling in embodiments of the present disclosure may be an indirect coupling or a communication connection between apparatuses, units, or modules in an electrical form, a mechanical form, or another form, and is used for information exchange between the apparatuses, the units, or the modules. The processor 820 may collaboratively operate with the memory 830. The processor 820 may execute the program instructions stored in the memory 830.

A specific connection medium between the transceiver 810, the processor 820, and the memory 830 is not limited in embodiments of the present disclosure. In embodiments of the present disclosure, the memory 830, the processor 820, and the transceiver 810 are connected through a bus 840 in FIG. 8. The bus is represented by a thick line in FIG. 8, and connections between other components are merely examples for description, and shall not be construed as a limitation. The bus may be classified into an address bus, a data bus, a control bus, and the like. For ease of representation, only one thick line is used in FIG. 8 to represent the bus, but this does not mean that there is only one bus or only one type of bus.

In embodiments of the present disclosure, the processor may be a general-purpose processor, a digital signal processor, an application-specific integrated circuit, a field programmable gate array or another programmable logic device, a discrete gate or transistor logic device, a discrete hardware component, or the like, and may implement or execute the methods, steps, and logical block diagrams disclosed in embodiments of the present disclosure. The general-purpose processor may be a microprocessor or any conventional processor or the like. The steps of the methods disclosed with reference to embodiments of the present disclosure may be directly executed and accomplished by a hardware processor, or may be executed and accomplished by using a combination of hardware and software modules in the processor, or the like.

In embodiments of the present disclosure, the memory may include but be not limited to a non-volatile memory such as a hard disk drive (HDD) or a solid-state drive (SSD), a random-access memory (RAM), an erasable programmable read-only memory (EPROM), a read-only memory (ROM), a compact disc read-only memory (CD-ROM), or the like. The memory is but not limited to any storage medium that can be used to carry or store program code in a form of instructions or data structures and that can be read and/or written by a computer (such as the communication apparatus illustrated in the present disclosure). The memory in embodiments of the present disclosure may alternatively be a circuit or any other apparatus that can implement a storage function, and is configured to store program instructions and/or data.

It may be understood that when the communication apparatus is configured to perform a function or a step performed by the terminal device, the processor 820 is mainly configured to process a communication protocol and communication data, control the entire communication apparatus, execute a software program, and process data of the software program. The memory 830 is mainly configured to store a software program and data. The transceiver 810 may include a control circuit and an antenna. The control circuit is mainly configured to perform conversion between a baseband signal and a radio frequency signal, and process the radio frequency signal. The antenna is mainly configured to receive and send a radio frequency signal in a form of an electromagnetic wave. An input/output apparatus such as a touchscreen, a display, or a keyboard is mainly configured to receive data input by a user and output data to the user.

After the communication apparatus is powered on, the processor 820 may read the software program in the memory 830, interpret and execute instructions of the software program, and process data of the software program. When data needs to be sent wirelessly, the processor 820 performs baseband processing on the to-be-sent data, and then outputs a baseband signal to a radio frequency circuit. The radio frequency circuit performs radio frequency processing on the baseband signal, and then sends a radio frequency signal in a form of an electromagnetic wave by using the antenna. When data is sent to the communication apparatus, the radio frequency circuit receives a radio frequency signal by using the antenna, converts the radio frequency signal into a baseband signal, and outputs the baseband signal to the processor 820. The processor 820 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

It may be understood that the communication apparatus illustrated in embodiments of the present disclosure may have more components than those shown in FIG. 8, which is not limited in embodiments of the present disclosure. The methods performed by the processor and the transceiver are merely examples. For specific steps performed by the processor and the transceiver, refer to the methods described above.

Figure 9:
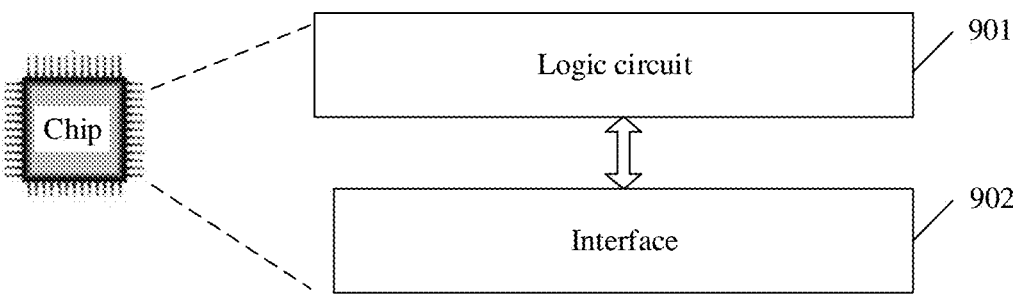

In another possible implementation, in the communication apparatus shown in FIG. 7, the processing unit 701 may be one or more logic circuits, the sending unit 703 may be an output interface, and the receiving unit 702 may be an input interface. Alternatively, the sending unit 703 and the receiving unit 702 may be integrated into one unit, for example, an input/output interface. The input/output interface is also referred to as a communication interface, an interface circuit, an interface, or the like. As shown in FIG. 9, a communication apparatus shown in FIG. 9 includes a logic circuit 901 and an interface 902. To be specific, the processing unit 701 may be implemented through the logic circuit 901, and the receiving unit 702 and the sending unit 703 may be implemented through the interface 902. The logic circuit 901 may be a chip, a processing circuit, an integrated circuit, a system on a chip (SoC) chip, or the like. The interface 902 may be a communication interface, an input/output interface, a pin, or the like. For example, FIG. 9 shows an example in which the communication apparatus is a chip. The chip includes the logic circuit 901 and the interface 902.

In embodiments of the present disclosure, the logic circuit and the interface may also be coupled to each other. Specific connection manners of the logic circuit and the interface are not limited in embodiments of the present disclosure.

For example, when the communication apparatus is configured to perform a method, a function, or a step performed by the terminal device, the interface 902 is configured to input configuration information, and is further configured to output a first SRS and a first PUSCH.

It may be understood that the logic circuit 901 may be configured to obtain the first SRS based on a first SRS configuration, and then output the first SRS through the interface 902. The logic circuit 901 is further configured to obtain the first PUSCH based on the first PUSCH, and then output the first PUSCH through the interface 902.

For example, the logic circuit 901 is configured to parse the input configuration information, to obtain content in the configuration information. For example, the logic circuit 901 is further configured to generate a first SRS based on the first SRS configuration, and output the first SRS through the interface 902. For example, the logic circuit 901 is further configured to generate a first PUSCH based on a first PUSCH configuration, and output the first PUSCH through the interface 902.

For example, the logic circuit is further configured to control the interface 902 to output the first PSUCH through an antenna port or an open-loop power control parameter or both that are the same as that of the first SRS.

For example, the interface 902 is further configured to input first DCI.

For example, the logic circuit 901 is further configured to switch from a second BWP to a first BWP.

For example, when the communication apparatus is configured to perform a method, a function, or a step performed by the access network device (for example, the base station), the logic circuit 901 is configured to obtain configuration information, and the interface 902 is configured to output the configuration information and input a first SRS and a first PUSCH. It may be understood that the logic circuit 901 may be further configured to process the first SRS and the first PUSCH that are input, and the like. This is not limited in embodiments of the present disclosure.

It may be understood that the communication apparatus shown in embodiments of the present disclosure may implement the method provided in embodiments of the present disclosure in a form of hardware, in a form of software, or the like. This is not limited in embodiments of the present disclosure.

For specific implementations of the embodiments shown in FIG. 9, refer to the foregoing embodiments.

An embodiment of the present disclosure further provides a wireless communication system. The wireless communication system includes a terminal device and an access network device. The terminal device and the access network device may be configured to perform a method in any one of the foregoing embodiments (as shown in FIG. 4 to FIG. 6).

In addition, the present disclosure further provides a computer program. The computer program is used to implement operations and/or processing performed by a terminal device in a method provided in the present disclosure.

The present disclosure further provides a computer program. The computer program is used to implement operations and/or processing performed by an access network device in a method provided in the present disclosure.

The present disclosure further provides a computer-readable storage medium. The computer-readable storage medium stores computer code. When the computer code is run on a computer, the computer is enabled to perform operations and/or processing performed by a terminal device in a method provided in the present disclosure.

The present disclosure further provides a computer-readable storage medium. The computer-readable storage medium stores computer code. When the computer code is run on a computer, the computer is enabled to perform operations and/or processing performed by an access network device in a method provided in the present disclosure.

The present disclosure further provides a computer program product. The computer program product includes computer code or a computer program. When the computer code or the computer program is run on a computer, operations and/or processing performed by a terminal device in a method provided in the present disclosure are performed.

The present disclosure further provides a computer program product. The computer program product includes computer code or a computer program. When the computer code or the computer program is run on a computer, operations and/or processing performed by an access network device in a method provided in the present disclosure is performed.

In the several embodiments provided in the present disclosure, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one place, or may be distributed on a plurality of network units. Some or all of the units may be selected based on actual needs to achieve the technical effects of the solutions provided in embodiments of the present disclosure.

In addition, functional units in embodiments of the present disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in a form of a software product. The computer software product is stored in a readable storage medium, and includes several instructions for instructing a computer device (which may be a personal computer, a server, a network device, or the like) to perform all or some of the steps of the methods described in embodiments of the present disclosure. The readable storage medium includes any medium that may store program code, such as a USB flash drive, a removable hard disk, a read-only memory (ROM), a random access memory (RAM), a magnetic disk, or an optical disc.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:

receiving configuration information, wherein the configuration information comprises an association relationship between a first sounding reference signal (SRS) configuration and one or more physical uplink shared channel (PUSCH) configurations, and a first bandwidth part (BWP) in which the first SRS configuration is located is different from a BWP in which each of the one or more PUSCH configurations is located;

sending a first SRS on the first BWP based on the first SRS configuration; and sending a first PUSCH based on a first PUSCH configuration in the one or more PUSCH configurations, wherein the sending a first SRS on the first BWP based on the first SRS configuration comprises:

switching from a second BWP to the first BWP and sending the first SRS on the first BWP based on the first SRS configuration, wherein the second BWP is one of BWPs in which the one or more PUSCH configurations are located, and a transmission power adjustment value of the first SRS is related to a transmission power adjustment value indicated by a transmission power control (TPC) command value carried in DCI corresponding to one or more PUSCHs on the second BWP.

2. The method according to claim 1, wherein the first SRS is a positioning signal.

3. The method according to claim 1, wherein the sending a first PUSCH comprises:

sending the first PUSCH through an antenna port that is the same as that of the first SRS; and/or sending the first PUSCH by using an open-loop power control parameter that is the same as that of the first SRS.

4. The method according to claim 1, wherein the first PUSCH configuration is further associated with a second SRS configuration, and the method further comprises:

receiving first DCI, wherein the first DCI carries first indication information indicating that the first PUSCH is associated with the first SRS configuration or is associated with the second SRS configuration.

5. The method according to claim 4, wherein the first SRS configuration comprises configuration information of a plurality of SRS resources, the first DCI further carries a sounding reference signal resource indicator (SRI), and the SRI indicates an SRS resource, in the plurality of SRS resources, that is associated with the first PUSCH.

6. The method according to claim 5, wherein the SRI further indicates an open-loop power control parameter and/or a closed-loop power control status of the first PUSCH.

7. The method according to claim 1, wherein DCI corresponding to a PUSCH on the second BWP is not DCI used to schedule a PUSCH.

8. The method according to claim 1, wherein each of the one or more PUSCH configurations on the second BWP corresponds to one or more pieces of DCI.

9. The method according to claim 1, wherein a transmission power adjustment value of the first SRS is related to a transmission power adjustment value indicated by a TPC command value carried in DCI received on a BWP corresponding to one or more BWPs in which the one or more PUSCH configurations are located; or a transmission power adjustment value of the first SRS is related to a transmission power adjustment value indicated by a TPC command value carried in DCI received by a terminal device on one or more configured carriers (CCs).

10. A communication apparatus, comprising:

a receiver, configured to receive configuration information, wherein the configuration information comprises an association relationship between a first sounding reference signal (SRS) configuration and one or more physical uplink shared channel (PUSCH) configurations, and a first bandwidth part (BWP) in which the first SRS configuration is located is different from a BWP in which each of the one or more PUSCH configurations is located; and a sender, configured to: send a first SRS on the first BWP based on the first SRS configuration; and send a first PUSCH based on a first PUSCH configuration in the one or more PUSCH configurations, wherein the apparatus further comprises a processor, and the sender is further configured to: switch from a second BWP to the first BWP by using the processor, and send the first SRS on the first BWP based on the first SRS configuration, wherein the second BWP is one of BWPs in which the one or more PUSCH configurations are located, and a transmission power adjustment value of the first SRS is related to a transmission power adjustment value indicated by a TPC command value carried in DCI corresponding to one or more PUSCHs on the second BWP.

11. The apparatus according to claim 10, wherein the first SRS is a positioning signal.

12. The apparatus according to claim 10, wherein the sender is further configured to: send the first PUSCH through an antenna port that is the same as that of the first SRS; and/or send the first PUSCH by using an open-loop power control parameter that is the same as that of the first SRS.

13. The apparatus according to claim 10, wherein the first PUSCH configuration is further associated with a second SRS configuration; and the receiver is further configured to receive first DCI, wherein the first DCI carries first indication information indicating that the first PUSCH is associated with the first SRS configuration or is associated with the second SRS configuration.

14. The apparatus according to claim 13, wherein the first SRS configuration comprises configuration information of a plurality of SRS resources, the first DCI further carries a sounding reference signal resource indicator (SRI), and the SRI indicates an SRS resource, in the plurality of SRS resources, that is associated with the first PUSCH.

15. The apparatus according to claim 14, wherein the SRI further indicates an open-loop power control parameter and/or a closed-loop power control status of the first PUSCH.

16. The apparatus according to claim 10, wherein DCI corresponding to a PUSCH on the second BWP is not DCI used to schedule a PUSCH.

17. The apparatus according to claim 10, wherein each of the one or more PUSCH configurations on the second BWP corresponds to one or more pieces of DCI.

18. The apparatus according to claim 10, wherein a transmission power adjustment value of the first SRS is related to a transmission power adjustment value indicated by a TPC command value carried in DCI received on a BWP corresponding to one or more BWPs in which the one or more PUSCH configurations are located; or a transmission power adjustment value of the first SRS is related to a transmission power adjustment value indicated by a TPC command value carried in DCI received by a terminal device on one or more configured carriers (CCs).

19. A non-transitory computer readable storage medium storing a computer program including instructions that, when executed by at least one processor, cause the at least one processor to perform operations comprising:

receiving configuration information, wherein the configuration information comprises an association relationship between a first sounding reference signal (SRS) configuration and one or more physical uplink shared channel (PUSCH) configurations, and a first bandwidth part (BWP) in which the first SRS configuration is located is different from a BWP in which each of the one or more PUSCH configurations is located;

sending a first SRS on the first BWP based on the first SRS configuration; and sending a first PUSCH based on a first PUSCH configuration in the one or more PUSCH configurations, wherein the sending a first SRS on the first BWP based on the first SRS configuration comprises:

switching from a second BWP to the first BWP, and sending the first SRS on the first BWP based on the first SRS configuration, wherein the second BWP is one of BWPs in which the one or more PUSCH configurations are located, and a transmission power adjustment value of the first SRS is related to a transmission power adjustment value indicated by a transmission power control (TPC) command value carried in DCI corresponding to one or more PUSCHs on the second BWP.

20. The non-transitory computer readable storage medium according to claim 19, wherein the first SRS is a positioning signal.

* * * * *